United States Patent
Saitoh

(10) Patent No.: US 9,377,307 B2
(45) Date of Patent: Jun. 28, 2016

(54) SEMICONDUCTOR DEVICE, ELECTRICAL DEVICE, AND METHOD OF CONTROLLING POWER SOURCE

(71) Applicant: LAPIS SEMICONDUCTOR CO., LTD., Kanagawa (JP)

(72) Inventor: Takayuki Saitoh, Kanagawa (JP)

(73) Assignee: LAPIS SEMICONDUCTOR CO., LTD., Kanagawa (JP)

( * ) Notice: Subject to any disclaimer, the term of this patent is extended or adjusted under 35 U.S.C. 154(b) by 242 days.

(21) Appl. No.: 14/100,283

(22) Filed: Dec. 9, 2013

(65) Prior Publication Data

US 2014/0188381 A1    Jul. 3, 2014

(30) Foreign Application Priority Data

Dec. 28, 2012  (JP) ................. 2012-287945

(51) Int. Cl.
| | |
|---|---|
| *G01C 21/00* | (2006.01) |
| *G01C 21/28* | (2006.01) |
| *G01S 19/34* | (2010.01) |
| *H04W 52/02* | (2009.01) |

(52) U.S. Cl.
CPC .............. *G01C 21/005* (2013.01); *G01C 21/28* (2013.01); *G01S 19/34* (2013.01); *H04W 52/0251* (2013.01); *Y02B 60/50* (2013.01)

(58) Field of Classification Search
CPC ...... G01C 21/005; G01C 21/28; G01S 19/34; H04W 52/0251; Y02B 60/50
USPC ......................................................... 701/409
See application file for complete search history.

(56) References Cited

U.S. PATENT DOCUMENTS

| | | | | |
|---|---|---|---|---|
| 3,563,155 A * | 2/1971 | Ishizawa | ............ | B61D 27/0009 454/105 |
| 6,108,602 A * | 8/2000 | Bairamis | ............ | B60H 1/00735 701/36 |
| 2001/0007967 A1* | 7/2001 | Yamamoto | ......... | B60H 1/00771 701/409 |
| 2005/0113124 A1* | 5/2005 | Syrjarinne | .............. | G01S 19/34 455/522 |
| 2006/0167647 A1* | 7/2006 | Krumm | ............. | H04M 1/72569 702/130 |
| 2007/0006098 A1* | 1/2007 | Krumm | ............... | G06F 17/3087 715/825 |

FOREIGN PATENT DOCUMENTS

| | | | |
|---|---|---|---|
| JP | 4191167 A | * | 7/1992 |
| JP | 11-352206 A | | 12/1999 |

* cited by examiner

*Primary Examiner* — Mussa A Shaawat
*Assistant Examiner* — Abdhesh Jha
(74) *Attorney, Agent, or Firm* — Kubotera & Associates, LLC

(57) ABSTRACT

A semiconductor device includes an atmospheric pressure value obtaining unit configured to obtain an atmospheric pressure value from an atmospheric pressure sensor; and a control unit configured to detect a variance state of the atmospheric pressure value obtained with the atmospheric pressure value obtaining unit. The control unit is further configured to control an on state and an off state of a power source of a GPS (Global Positioning System) device according to a determination whether the variance state satisfies a specific condition. The GPS device is configured to detect a position thereof based on a GPS signal received therewith and output positional information.

7 Claims, 15 Drawing Sheets

SEMICONDUCTOR DEVICE, ELECTRICAL DEVICE, AND METHOD OF CONTROLLING POWER SOURCE

BACKGROUND OF THE INVENTION AND RELATED ART STATEMENT

The present invention relates to a semiconductor device, an electrical device, and a method of controlling power source of an electrical device.

Recently, there have been widely available such an electrical device provided with a navigation system as a mobile device including a smartphone, a portable navigation system, and the like. Such an electrical device is provided with a GPS (Global Positioning System) device used for the navigation system. In the electrical device, it is necessary to maintain the GPS device in an operation state, so that the GPS device is capable of receiving a GPS signal indicating positional information that is transmitted from a GPS satellite. Accordingly, the GPS device tends to consume a large amount of electrical power, thereby increasing power consumption of a battery thereof. Therefore, in the GPS device, it has been required to reduce power consumption of the battery.

Patent Reference has disclosed a conventional electrical device configured to reduce the power consumption of the power source of the GPS device. The conventional electrical device disclosed in Patent Reference is configured to monitor a reception state of a reception circuit thereof that receives an electrical wave transmitted from the GPS satellite. When the reception circuit is not in the reception state of receiving the electrical wave, the conventional electrical device is configured to shut down power supplied from a power source circuit to the reception circuit. After a specific period of time is elapsed, the conventional electrical device resumes supplying power from the power source circuit to the reception circuit.

Patent Reference: Japanese Patent Publication No. 11-352206

In the conventional electrical device having the GPS device disclosed in Patent Reference, however, it may be sometimes difficult to properly reduce the power consumption thereof. For example, in the conventional electrical device disclosed in Patent Reference, even if the reception state is not ideal for an extended period of time longer than the specific period of time, the conventional electrical device resumes anyway supplying power to the reception circuit to monitor the reception state after the specific period of time is elapsed. Accordingly, in the conventional electrical device disclosed in Patent Reference, power is consumed to monitor the reception state during such an occasion, thereby making it difficult to reduce the power consumption.

In view of the problems described above, an object of the present invention is to provide a semiconductor device and an electrical device having the GPS device capable of solving the problems of the conventional electrical device. A further object of the present invention is to provide a method of controlling a power source. In the present invention, it is possible to reduce the power consumption of the electrical device having the GPS device.

Further objects and advantages of the invention will be apparent from the following description of the invention.

SUMMARY OF THE INVENTION

In order to attain the objects described above, according to a first aspect of the present invention, a semiconductor device includes an atmospheric pressure value obtaining unit configured to obtain an atmospheric pressure value from an atmospheric pressure sensor; and a control unit configured to detect a variance state of the atmospheric pressure value obtained with the atmospheric pressure value obtaining unit. The control unit is further configured to control an on state and an off state of a power source of a GPS (Global Positioning System) device according to a determination whether the variance state satisfies a specific condition. The GPS device is configured to detect a position thereof based on a GPS signal received therewith and output positional information.

According to a second aspect of the present invention, an electrical device includes the semiconductor device in the first aspect. Further, the electrical device includes a GPS device configured to detect a position thereof based on a GPS signal received therewith; a power supplying unit configured to supply power to the GPS device; and a display unit configured to display a position detection result of the GPS device.

According to a third aspect of the present invention, a method of controlling a power source includes an atmospheric pressure value obtaining step of obtaining an atmospheric pressure value from an atmospheric pressure sensor; a step of detecting a variance state of the atmospheric pressure value obtained in the atmospheric pressure value obtaining step; and a power source controlling step of controlling an on state and an off state of a power source of a GPS (Global Positioning System) device according to a determination whether the variance state satisfies a specific condition. The GPS device is configured to detect a position thereof based on a GPS signal received therewith.

According to the present invention, it is possible to reduce the power consumption of the electrical device having the GPS device.

DETAILED DESCRIPTION OF PREFERRED EMBODIMENTS

Hereunder, preferred embodiments of the present invention will be explained with reference to the accompanying drawings.

First Embodiment

Figure 1:
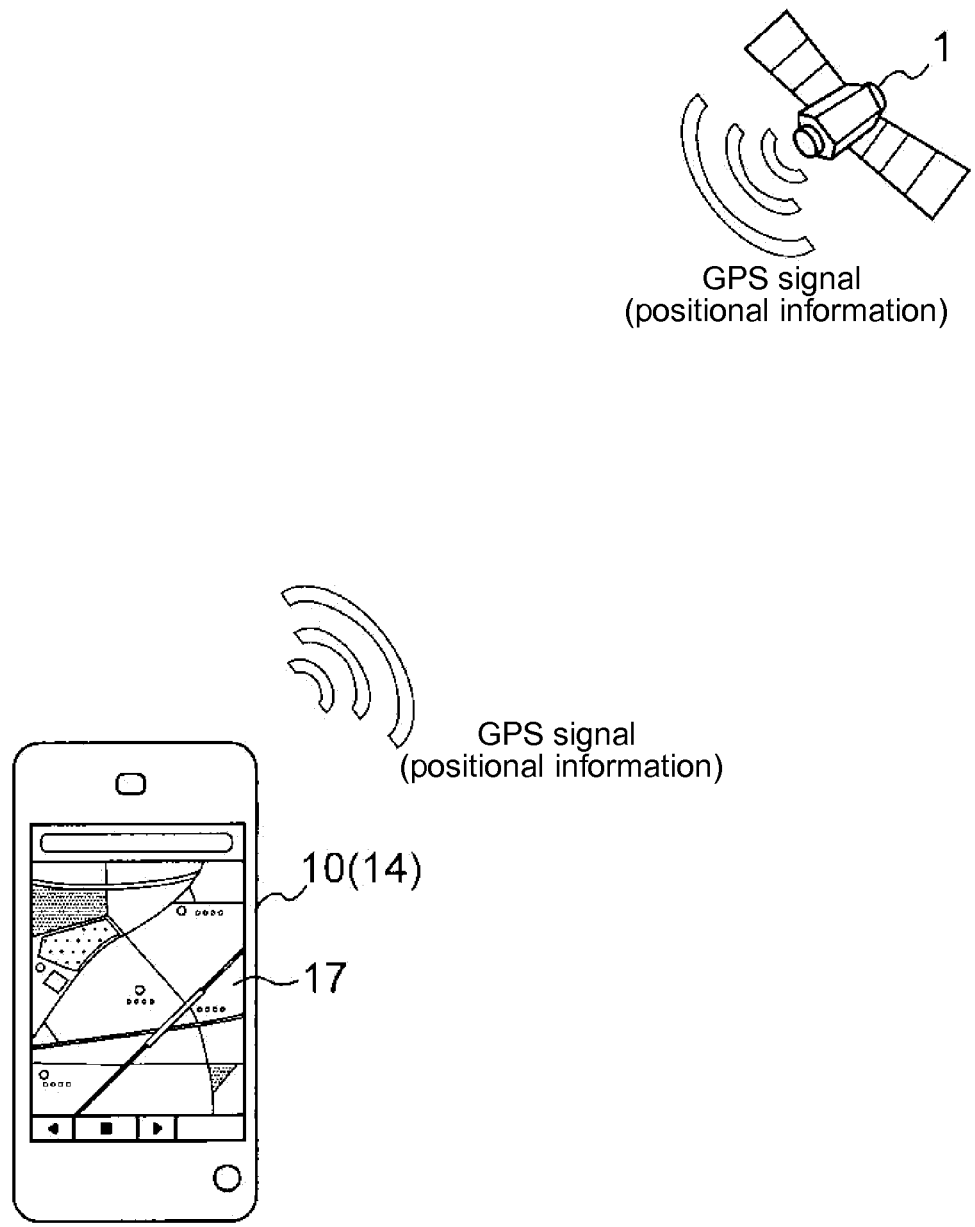
FIG. 1 is a schematic diagram showing a navigation system using an electrical device according to a first embodiment of the present invention.

A first embodiment of the present invention will be explained. FIG. 1 is a schematic diagram showing a navigation system using an electrical device 10 according to the first embodiment of the present invention.

As shown in FIG. 1, the semiconductor device 10 includes a GPS (Global Positioning System) 14 as a GPS device for receiving a GPS signal transmitted from a GPS satellite 1. The GPS signal contains positional information such that the GPS 14 detects a position of the electrical device 10 according to the positional information of the GPS signal thus received.

In the first embodiment, the electrical device 10 further includes a display unit 17 for displaying the position of the electrical device 10 detected with the GPS 14. In the electrical device 10, when the GPS 14 is in an operation state, the GPS 14 is configured to receive the GPS signal transmitted from the GPS satellite 1. On the other hand, when the GPS 14 is not in the operation state, the GPS 14 is configured not to receive the GPS signal transmitted from the GPS satellite 1.

In the first embodiment shown in FIG. 1, the electrical device 10 is a smartphone as an example. The present invention is not limited to the first embodiment, and the electrical device 10 may be other type of mobile electrical device or non-mobile electrical device as long as the electrical device 10 is provided with the GPS 14.

Figure 2:
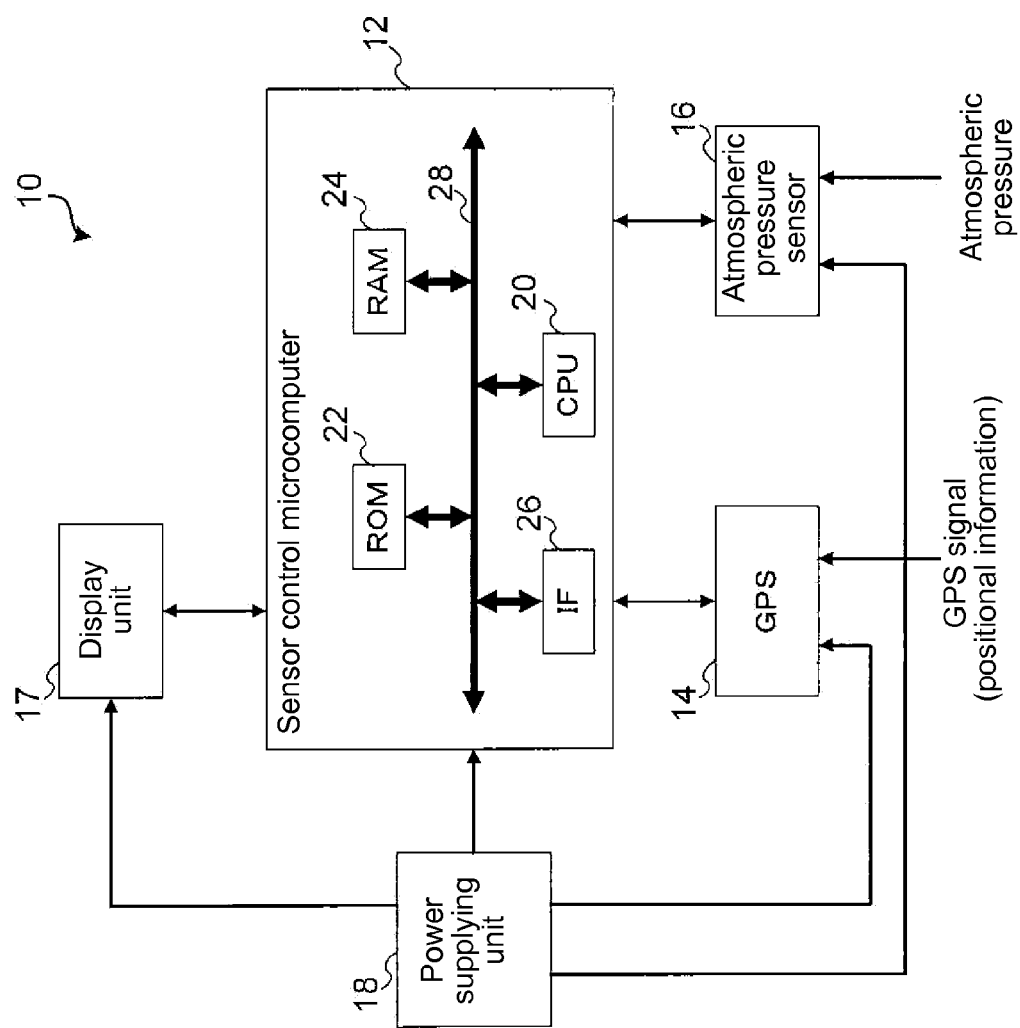
FIG. 2 is a block diagram showing a configuration of the electrical device according to the first embodiment of the present invention.

FIG. 2 is a block diagram showing a configuration of the electrical device 10 according to the first embodiment of the present invention. As shown in FIG. 2, the electrical device 10 includes a sensor control microcomputer 12; the GPS 14; an atmospheric pressure sensor 16; the display unit 17; and a power supplying unit 18.

In the first embodiment, the sensor control microcomputer 12 is configured to control the GPS 14, the atmospheric pressure sensor 16, and the display unit 17. As shown in FIG. 2, the sensor control microcomputer 12 includes a CPU (Central Processing Unit) 20; an ROM (Read Only Memory) 22; an RAM (Random Access Memory) 24; and an IF (Interface) 26. The ROM 22 stores a program for performing a GPS control process (described later). When the CPU 20 executes the program, predetermined functions of the program are realized. Further, when the CPU 20 executes the program, the RAM 24 functions as a work memory and the like. The IF 26 is provided for enabling transmission and reception of various information among the sensor control microcomputer 12, the GPS 14, the atmospheric pressure sensor 16, and the display unit 17. The CPU 20, the ROM 22, the RAM 24, and the IF 26 are connected to each other through a bus 28.

In the first embodiment, the GPS 14 is configured to receive the GPS signal transmitted from the electrical device 10. Further, the GPS 14 is configured to detect the current position of the electrical device 10 according to the GPS signal thus received.

In the first embodiment, the atmospheric pressure sensor 16 is not limited to a specific configuration as long as the atmospheric pressure sensor 16 is capable of measuring an atmospheric pressure in at least one of an environment surrounding the electrical device 10 or an inside of the electrical device 10. It should be noted that the atmospheric pressure sensor 16 consumes less electrical current as opposed to the GPS 14, thereby making power consumption thereof smaller than that of the GPS 14.

In the first embodiment, the display unit 17 is configured to display the current position of the electrical device 10 detected with the GPS 14 and the like. More specifically, the display unit 17 is formed of a touch panel, a liquid crystal display, and the like.

In the first embodiment, the power supplying unit 18 is configured to supply power to a power source of each of the sensor control microcomputer 12, the GPS 14, the atmospheric pressure sensor 16, and the display unit 17. Accordingly, the sensor control microcomputer 12, the GPS 14, the atmospheric pressure sensor 16, and the display unit 17 are driven with power supplied from the power supplying unit 18. It should be noted that the configuration is not limited to that in the first embodiment, in which the power supplying unit 18 supplies power to the sensor control microcomputer 12, the GPS 14, the atmospheric pressure sensor 16, and the display unit 17. For example, the power supplying unit 18 may be configured to supply power only to the GPS 14, and another power supplying unit may be provided for supplying power to the sensor control microcomputer 12, the atmospheric pressure sensor 16, and the display unit 17. In other words, the power supplying source of the sensor control microcomputer 12, the atmospheric pressure sensor 16, and the display unit 17 is not limited to the power supplying unit 18.

Figure 3:
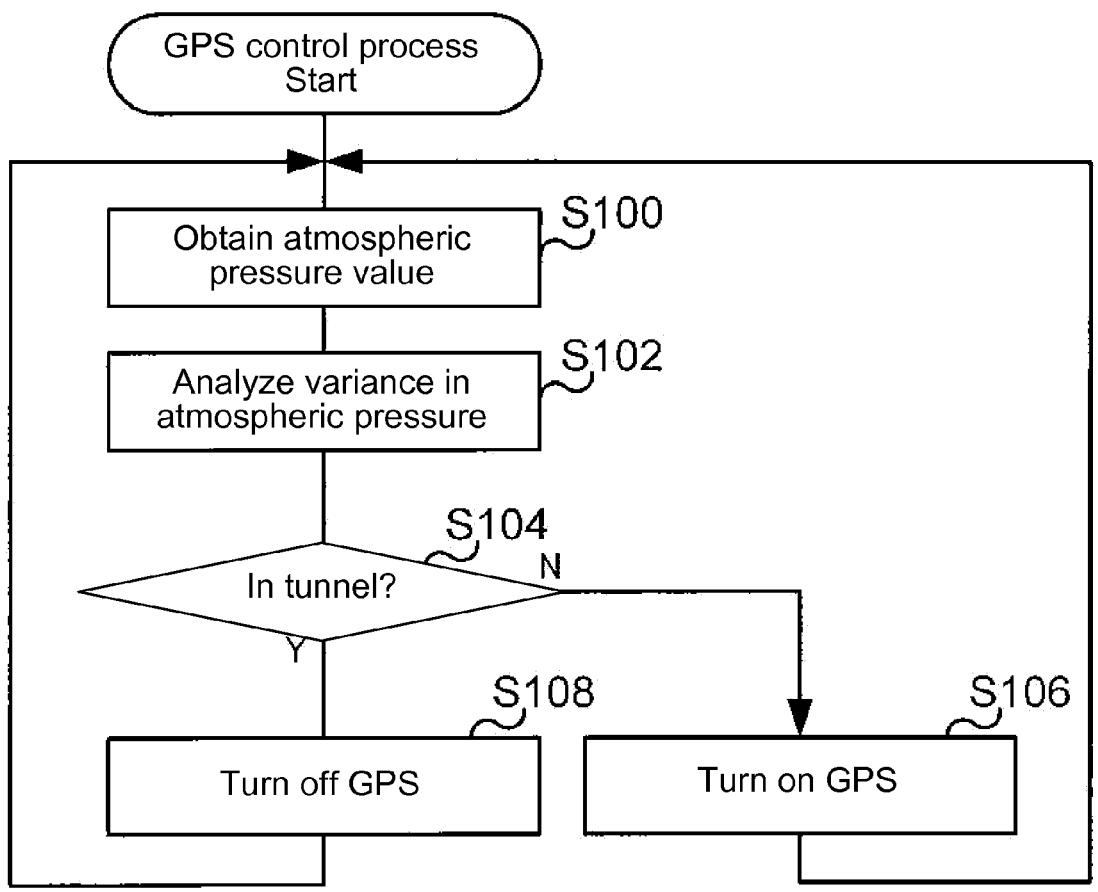
FIG. 3 is a flowchart showing an operation of a sensor control microcomputer of the electrical device in a GPS (Global Positioning System) control process according to the first embodiment of the present invention.

An operation of the sensor control microcomputer 12 in the GPS control process will be explained next. FIG. 3 is a flowchart showing the operation of the sensor control microcomputer 12 of the electrical device 10 in the GPS (Global Positioning System) control process according to the first embodiment of the present invention. It should be noted that, in the first embodiment, the GPS control process shown in FIG. 3 starts being executed, for example, when a main power source (not shown) of the electrical device 10 is turned on.

In step S100, the sensor control microcomputer 12 obtains the atmospheric pressure value from the atmospheric pressure sensor 16. More specifically, the sensor control microcomputer 12 regularly obtains the atmospheric pressure value in a specific period of time from the atmospheric pressure sensor 16. In other words, the sensor control microcomputer 12 regularly obtains a plurality the atmospheric pressure values from the atmospheric pressure sensor 16. Although the sensor control microcomputer 12 is configured to regularly obtain the atmospheric pressure value as described above, the present invention is not limited thereto, and the sensor control microcomputer 12 may be configured to obtain the atmospheric pressure value at a predetermined timing. Further, it should be noted that the specific period of time during which the atmospheric pressure value is obtained may be predetermined in consideration of an analytical method in step S102 (described later), an environment of the electrical device 10, and the like.

In step S102, the sensor control microcomputer 12 analyzes a variance in the atmospheric pressure from the atmospheric pressure values thus obtained. In step S104, the sensor control microcomputer 12 determines whether the current position of the electrical device 10 is in a tunnel according to the analysis result in step S102.

Figure 4:
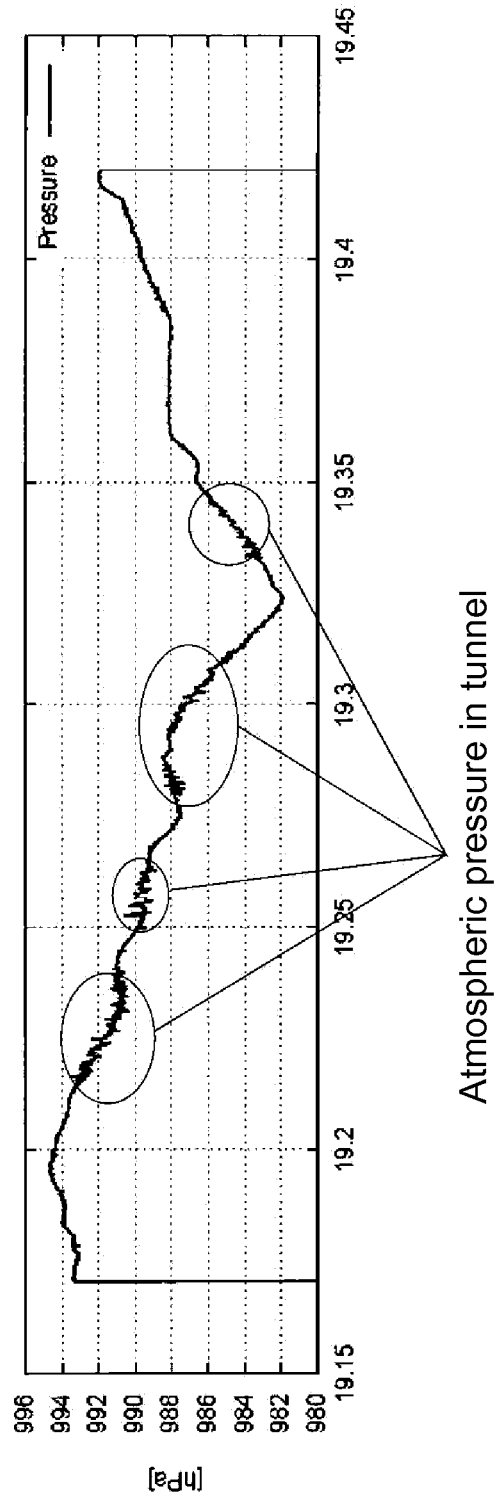
FIG. 4 is a graph showing an example of a variance in an atmospheric pressure value detected with an atmospheric pressure sensor of the electrical device according to the first embodiment of the present invention.

FIG. 4 is a graph showing an example of the variance in the atmospheric pressure value detected with the atmospheric pressure sensor 16 of the electrical device 10 according to the first embodiment of the present invention.

As shown in FIG. 4, in general, the atmospheric pressure tends to be disturbed in a tunnel. In other words, an amplitude of a wave shape of the atmospheric pressure value tends to become large in a tunnel. Accordingly, in the first embodiment, the sensor control microcomputer 12 analyzes the variance in the atmospheric pressure value, so that the sensor control microcomputer 12 is able to determine that the electrical device 10 is in a tunnel when the atmospheric pressure value is disturbed.

As described above, in step S102, the sensor control microcomputer 12 analyzes the wave shape of the atmospheric pressure from the atmospheric pressure values obtained during the specific period of time, so that the sensor control microcomputer 12 analyzes the variance in the atmospheric pressure. It should be noted that the sensor control microcomputer 12 analyzes the wave shape of the atmospheric pressure with an analytical method not limited to any specific one. For example, the analytical method may use a dispersion, a standard deviation, a difference between the maximum value and the minimum value, a time moving average, a differentiation process, an amplitude of an atmospheric pressure wave shape, and the like.

In the first embodiment, a threshold value (a reference value) is stored in advance in a storage unit such as the ROM 22 according to the analytical method used in step S102. The threshold value represents the variance in the wave shape of the atmospheric pressure value, so that the sensor control microcomputer 12 is able to determine that the electrical device 10 is in a tunnel.

As described above, in step S104, the sensor control microcomputer 12 determines whether the current position of the electrical device 10 is in a tunnel according to the analysis result in step S102. More specifically, in the first embodiment, the sensor control microcomputer 12 is configured to compare the threshold value thus stored with the analysis result in step S102. When the sensor control microcomputer 12 determines that the analysis result matches or is within an allowable range that is determined in advance and considered as matching to the threshold value, the sensor control microcomputer 12 determines that the current position of the electrical device 10 is in a tunnel.

For example, when the analytical method uses the dispersion, the threshold value for the dispersion is stored in advance. In this case, when the dispersion exceeds the threshold value, the sensor control microcomputer 12 determines that the current position of the electrical device 10 is in a tunnel. Similarly, when the analytical method uses the standard deviation, the threshold value for the standard deviation is stored in advance. In this case, when the standard deviation exceeds the threshold value, the sensor control microcomputer 12 determines that the current position of the electrical device 10 is in a tunnel.

Further, when the analytical method uses the difference between the maximum value and the minimum value, the threshold value for the difference between the maximum value and the minimum value is stored in advance. In this case, when the difference between the maximum value and the minimum value exceeds the threshold value, the sensor control microcomputer 12 determines that the current position of the electrical device 10 is in a tunnel.

Alternatively, it may be configured such that when a difference between the maximum value and an average value of the atmospheric pressure exceeds the threshold value, and when a difference between the minimum value and the average value of the atmospheric pressure exceeds the threshold value, the sensor control microcomputer 12 determines that the current position of the electrical device 10 is in a tunnel. Further, it may be configured such that when the difference between the maximum value and the average value of the atmospheric pressure exceeds the threshold value, or when the difference between the minimum value and the average value of the atmospheric pressure exceeds the threshold value, the sensor control microcomputer 12 determines that the current position of the electrical device 10 is in a tunnel.

In the first embodiment, the sensor control microcomputer 12 may be configured to analyze analyzes the variance in the atmospheric pressure using a combination of a plurality of analytical methods described above. In this case, when the sensor control microcomputer 12 determines that the current position of the electrical device 10 is in a tunnel according to the analytical methods in a number equal to or greater than a specific number, the sensor control microcomputer 12 eventually determines that the current position of the electrical device 10 is in the tunnel. On the other hand, when the sensor control microcomputer 12 determines that the current position of the electrical device 10 is in a tunnel according to the analytical methods in a number less than the specific number, the sensor control microcomputer 12 eventually determines that the current position of the electrical device 10 is not in the tunnel. In this case, it should be noted that the specific number does not exclude one.

In the GPS control process, when the sensor control microcomputer 12 determines that the current position of the electrical device 10 is not in the tunnel in step S104, the process proceeds to step S106. In step S106, the power source of the GPS 14 is turned on. Afterward, the process returns to step S100, so that the GPS control process is repeated. In the GPS control process, when the power source of the GPS 14 is turned off, the power source of the GPS 14 is turned on in step S106. On the other hand, when the power source of the GPS 14 is turned on already, the power source of the GPS 14 is maintained to be in the on state in step S106.

In the GPS control process, when the sensor control microcomputer 12 determines that the current position of the electrical device 10 is in the tunnel in step S104, the process proceeds to step S108. In step S108, the power source of the GPS 14 is turned off. Afterward, the process returns to step S100, so that the GPS control process is repeated. In the GPS control process, when the power source of the GPS 14 is turned on, the power source of the GPS 14 is turned off in step S108. On the other hand, when the power source of the GPS 14 is turned off already, the power source of the GPS 14 is maintained to be in the off state in step S108.

In general, the GPS signal (an electromagnetic wave) transmitted from the GPS satellite 1 exhibits insufficient ability of reaching the GPS 14 in a tunnel. Accordingly, when the electrical device 10 is in a tunnel, it is difficult to detect the current position of 210 using the GPS 14. For this reason, in the first embodiment, when the electrical device 10 is in a tunnel, the sensor control microcomputer 12 controls and turns off the power source of the GPS 14.

In the first embodiment, before the power source of the GPS 14 is turned off, it may be configured such that the current position detected with the GPS 14 immediately before is stored in a storage unit such as the ROM 22 and the like. Accordingly, when it is necessary to display the current position of the electrical device 10 while being in a tunnel (or when a user instructs the electrical device 10 to display the current position thereof), it is possible to display the current position of the electrical device 10 thus stored on the display unit 17.

As described above, after the power source of the GPS 14 is turned off in step S108, the process returns to step S100, so that the GPS control process is repeated. When the sensor control microcomputer 12 determines that the current position of the electrical device 10 is not in the tunnel in step S104, the process proceeds to step S106, so that the power source of the GPS 14 is turned on again. In other words, in the first embodiment, when it is detected that the electrical device 10 comes out from the tunnel, the power source of the GPS 14 is switched from the off state to the on state. Accordingly, when the electrical device 10 comes out from the tunnel, the GPS 14 receives the GPS signal transmitted from the GPS satellite 1. As a result, it is possible to detect the current position of the electrical device 10 according to the positional information.

In the first embodiment, it should be noted that the GPS control process is repeated regularly until the power source of the electrical device 10 (the sensor control microcomputer 12) is turned off.

As described above, in the first embodiment, the sensor control microcomputer 12 analyzes the wave shape of the atmospheric pressure values obtained with the atmospheric pressure sensor 16 for the specific period of time, so that the CPU 20 determines whether the electrical device 10 is in a tunnel according to the threshold value (the reference value) determined in advance. When the sensor control microcomputer 12 determines that the electrical device 10 is in the tunnel, the sensor control microcomputer 12 controls the power source of the GPS 14 to turn off. When the sensor control microcomputer 12 determines that the electrical device 10 comes out from the tunnel, the sensor control microcomputer 12 controls the power source of the GPS 14 to turn on.

Through the GPS control process described above, the power source of the GPS 14 is turned off when the electrical device 10 is in the tunnel where the GPS signal becomes hard to reach the GPS 14. Accordingly, it is possible to reduce the electrical current consumption and the power consumption of the GPS 14, thereby reducing the power consumption of the electrical device 10.

Further, in the first embodiment, the atmospheric pressure sensor 16 is provided for detecting the atmospheric pressure value, and the atmospheric pressure sensor 16 has the electrical current consumption and the power consumption smaller than that of the GPS 14. Accordingly, it is possible to effectively reduce the power consumption of the electrical device 10.

Further, in the first embodiment, it is possible to determine whether the electrical device 10 is in a tunnel without the map information. Accordingly, even when the electrical device 10 is used in an environment without having the map information, it is possible to reduce the power consumption of the GPS 14. Further, it is possible to detect that the electrical device 10 comes out from a tunnel. Accordingly, even when a moving distance and the like is not regularly calculated while being in the tunnel, it is possible to reduce a calculation amount of the moving distance, thereby reducing the power consumption of the GPS 14.

Second Embodiment

A second embodiment of the present invention will be explained next. In the second embodiment, it is configured to detect a moving state of the electrical device 10 (a user who carries the electrical device 10). Accordingly, it is possible to determine whether the electrical device 10 is in a tunnel according to the moving state of the electrical device 10.

Figure 5:
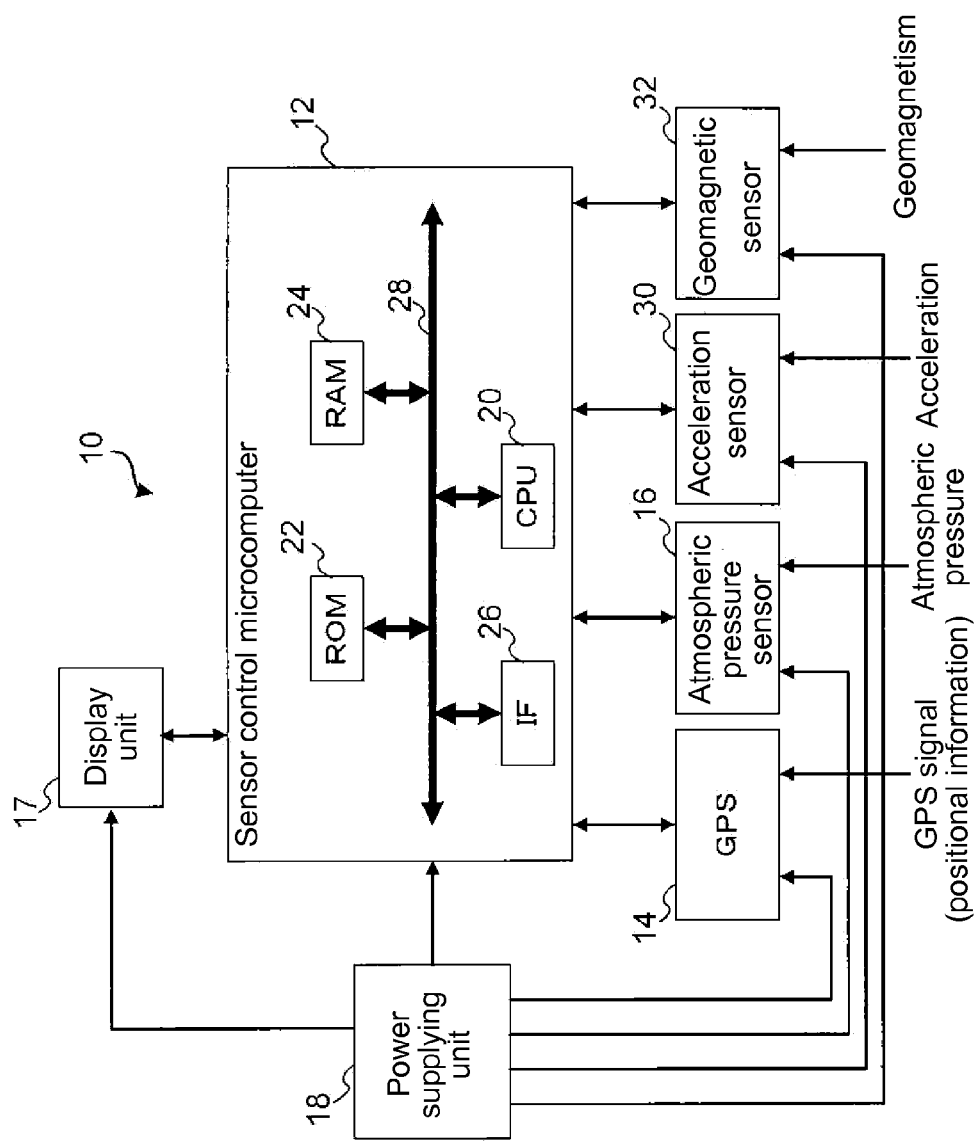
FIG. 5 is a block diagram showing a configuration of an electrical device according to a second embodiment of the present invention.

FIG. 5 is a block diagram showing a configuration of the electrical device 10 according to the second embodiment of the present invention. It should be noted that the electrical device 10 in the second embodiment includes components and performs an operation similar to those of the electrical device 10 in the first embodiment. Accordingly, the components in the second embodiment similar to those in the first embodiment are designated with the same reference numerals, and explanations thereof are omitted.

As shown in FIG. 5, the electrical device 10 includes the sensor control microcomputer 12; the GPS 14; the atmospheric pressure sensor 16; the display unit 17; the power supplying unit 18; an acceleration sensor 30; and a geomagnetic sensor 32. It should be noted that, different from the first embodiment, the electrical device 10 in the second embodiment includes the acceleration sensor 30 and the geomagnetic sensor 32.

In the second embodiment, the acceleration sensor 30 is configured to detect an acceleration value, and output a detection result to the sensor control microcomputer 12. The acceleration sensor 30 is not limited to any specific one, and may include an acceleration sensor capable of detecting the acceleration value in one specific axis, or an acceleration sensor capable of detecting the acceleration value in each of a plurality of axes (two axes or three axes). When the acceleration sensor 30 is the acceleration sensor capable of detecting the acceleration value in one specific axis, the acceleration sensor 30 outputs the acceleration value in the specific axis as the detection result. When the acceleration sensor 30 is the acceleration sensor capable of detecting the acceleration value in each of a plurality of axes, the acceleration sensor 30 outputs the acceleration value in each of a plurality of axes as the detection result. Alternatively, the acceleration sensor 30 may be configured to calculate a composite value through combining the acceleration values in a plurality of axes, and output the composite value as the detection result.

In the second embodiment, the geomagnetic sensor 32 is configured to detect a geomagnetic value, and output a detection result to the sensor control microcomputer 12. The geomagnetic sensor 32 is not limited to any specific one, and may include a geomagnetic sensor capable of detecting the geomagnetic value in one specific axis, or a geomagnetic sensor capable of detecting the geomagnetic value in each of a plurality of axes (two axes or three axes). When the geomagnetic sensor 32 is the geomagnetic sensor capable of detecting the geomagnetic value in one specific axis, the geomagnetic sensor 32 outputs the geomagnetic value in the specific axis as the detection result. When the geomagnetic sensor 32 is the geomagnetic sensor capable of detecting the geomagnetic value in each of a plurality of axes, the geomagnetic sensor 32 outputs the geomagnetic value in each of a plurality of axes as the detection result. Alternatively, the geomagnetic sensor 32 may be configured to calculate a composite value through combining the geomagnetic values in a plurality of axes, and output the composite value as the detection result.

In the second embodiment, the power supplying unit 18 is provided for supplying power to the acceleration sensor 30 and the geomagnetic sensor 32 to be driven. The configuration is not limited thereto, and another power supplying unit may be provided for supplying power to the acceleration sensor 30 and the geomagnetic sensor 32 to be driven.

In the second embodiment, the sensor control microcomputer 12 is provided for controlling the acceleration sensor 30 and the geomagnetic sensor 32. Further, the sensor control microcomputer 12 is configured to determine whether the moving state of the electrical device 10 is a walking state according to the acceleration value obtained with the acceleration sensor 30 (described later in more detail). Further, the sensor control microcomputer 12 is configured to determine whether the moving state of the electrical device 10 is a moving state in an automobile or a moving state on a train according to the geomagnetic value obtained with the geomagnetic sensor 32 (described later in more detail).

Figure 6:
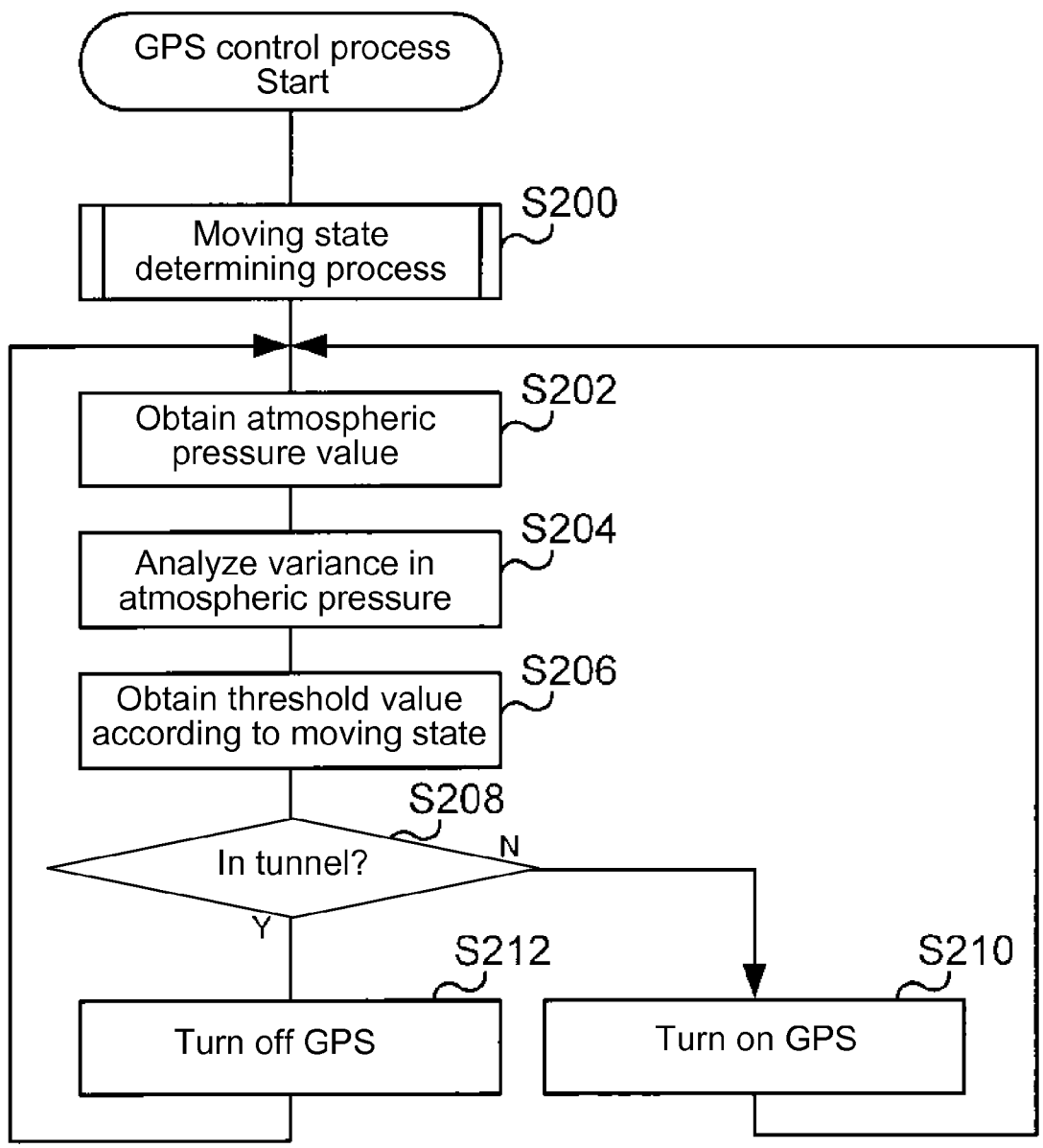
FIG. 6 is a flowchart showing an operation of a sensor control microcomputer of the electrical device in a GPS control process according to the second embodiment of the present invention.

An operation of the sensor control microcomputer 12 in the GPS control process will be explained next. FIG. 6 is a flowchart showing the operation of the sensor control microcomputer 12 of the electrical device 10 in the GPS (Global Positioning System) control process according to the second embodiment of the present invention. It should be noted that, the GPS control process shown in FIG. 6 includes steps similar to those in the GPS control process in the first embodiment (refer to FIG. 3). Accordingly, the steps in the second embodiment similar to those in the first embodiment are noted as such, and explanations thereof are omitted.

Figure 7:
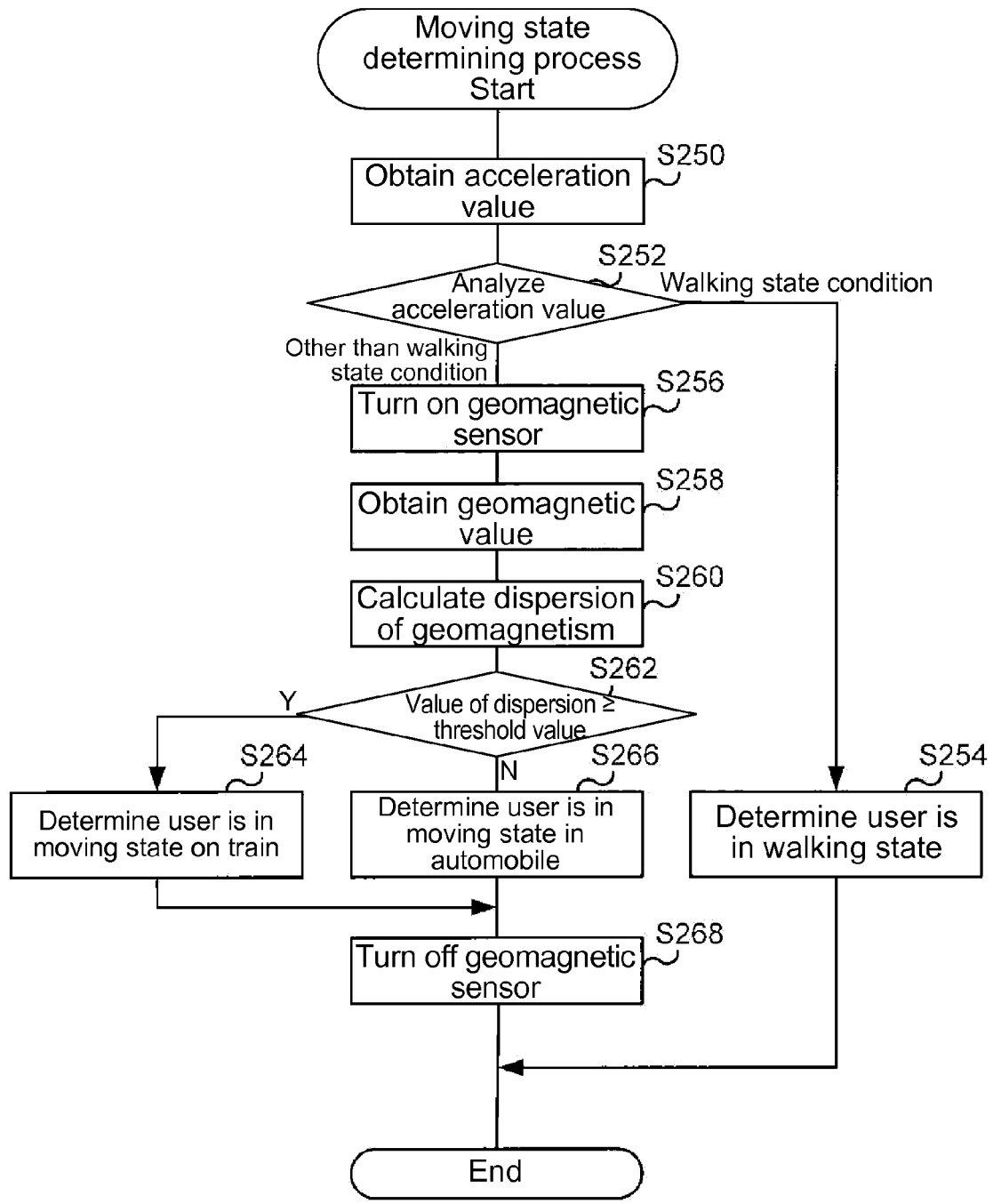
FIG. 7 is a flowchart showing the operation of the sensor control microcomputer of the electrical device in a moving state determining process in the GPS control process according to the second embodiment of the present invention.

In step S200, a moving state determining process is performed to determine that the moving state of the electrical device 10 is one of the walking state, the moving state in an automobile, and the moving state on a train. FIG. 7 is a flowchart showing the operation of the sensor control microcomputer 12 of the electrical device 10 in the moving state determining process in the GPS control process according to the second embodiment of the present invention.

In step S250, the sensor control microcomputer 12 obtains the acceleration values from the acceleration sensor 30. More specifically, the sensor control microcomputer 12 obtains the acceleration values for a specific period of time from the acceleration sensor 30. In other words, the sensor control microcomputer 12 obtains a plurality of acceleration values from the acceleration sensor 30. It should be noted that the specific period of time is the same as the period of time during which the sensor control microcomputer 12 obtains the atmospheric pressure values from the atmospheric pressure sensor 16 in the first embodiment. Alternatively, the specific period of time may not be the same as the period of time during which the sensor control microcomputer 12 obtains the atmospheric pressure values from the atmospheric pressure sensor 16 in the first embodiment.

In step S252, the sensor control microcomputer 12 analyzes the acceleration values thus obtained, and determines whether the acceleration values correspond to a predetermined condition (i.e., a waling state condition). The walking state condition is a condition for determining the walking state in which the user who carries the electrical device 10 is in the walking state. For example, in the walking state condition, a variance in the acceleration values in the specific period of time is less than a threshold value determined in advance. Alternatively, in the walking state condition, an amplitude or a cycle of a wave shape of the acceleration values in the specific period of time is within a range determined in advance (or out of a range determined in advance).

In the moving state determining process, when the sensor control microcomputer 12 determines that the acceleration values thus obtained satisfy the waling state condition in step S252, the process proceeds to step S254. In step S254, the sensor control microcomputer 12 determines that the user is in the waling state, thereby completing the process. The method of determining the moving state is not limited to the method using the acceleration values described above. Alternatively, the method of determining the moving state may be a well-known method such as the method disclosed in Japanese Patent Publication No. 2011-139301.

In the moving state determining process described above, the sensor control microcomputer 12 is configured to analyze the acceleration values to determine whether the moving state is the walking state or the moving state in an automobile or on a train. The present invention is not limited thereto, and the sensor control microcomputer 12 may be configured to analyze the acceleration values to determine whether the moving state is the walking state or a running state, or the moving state in a vehicle. Further, for example, a plurality of threshold values is provided for determining whether the moving state is the walking state, the running state, or the moving state in a vehicle.

In the moving state determining process described above, when the acceleration sensor 30 is capable of detecting the acceleration values in one specific axis, the sensor control microcomputer 12 determines the moving state using the acceleration values in one specific axis. When the acceleration sensor 30 is capable of detecting the acceleration values in a plurality of axes, the sensor control microcomputer 12 determines the moving state using the composite value of the acceleration values in a plurality of axes. Alternatively, the acceleration sensor 30 is capable of detecting the acceleration values in a plurality of axes, the sensor control microcomputer 12 may be configured to determine the moving state according to the largest acceleration value among the acceleration values in a plurality of axes.

In the moving state determining process, when the sensor control microcomputer 12 determines that the acceleration values thus obtained do not satisfy the waling state condition in step S252, the process proceeds to step S256. In step S256, the sensor control microcomputer 12 turns on the power source of the geomagnetic sensor 32. Accordingly, the geomagnetic sensor 32 starts the detection operation of the geomagnetic values.

In step S258, the sensor control microcomputer 12 obtains the geomagnetic values from the geomagnetic sensor 32. More specifically, the sensor control microcomputer 12 obtains the geomagnetic values for a specific period of time from the geomagnetic sensor 32. In other words, the sensor control microcomputer 12 obtains a plurality of geomagnetic values from the geomagnetic sensor 32. It should be noted that the specific period of time is the same as the period of time during which the sensor control microcomputer 12 obtains the atmospheric pressure values from the atmospheric pressure sensor 16 in the first embodiment, or the specific period of time during which the sensor control microcomputer 12 obtains the acceleration values from the acceleration sensor 30 in step S250. Alternatively, the specific period of time may not be the same as the period of time during which the sensor control microcomputer 12 obtains the atmospheric pressure values from the atmospheric pressure sensor 16 in the first embodiment, or the specific period of time during which the sensor control microcomputer 12 obtains the acceleration values from the acceleration sensor 30 in step S250.

In step S260, the sensor control microcomputer 12 calculates a dispersion of the geomagnetism values according to the geomagnetism values thus obtained. The dispersion of the geomagnetism values is calculated with the following equation (1):

$$\text{Dispersion} = \Sigma(\text{geomagnetism value} - \text{average of geomagnetism values})^2 \times \text{Number of the geomagnetism values} \quad (1)$$

In the moving state determining process, when the geomagnetism sensor 32 detects the geomagnetism values in one specific axis, the dispersion of the geomagnetism values in one specific axis is calculated with the equation (1). When the geomagnetism sensor 32 detects the geomagnetism values in a plurality of axes, the dispersion of the geomagnetism values is calculated with the equation (1) using the composite value combined of the geomagnetism values in a plurality of axes. Alternatively, the dispersion of the geomagnetism values in each of the axes may be calculated separately, so that the dispersion having the largest value among the dispersion in each of the axes is utilized as the calculation result in step S260.

Further, when the dispersion of the geomagnetism values is calculated with the equation (1) using the composite value, the sensor control microcomputer 12 may obtain the geomagnetism data and calculate the composite value combined of the geomagnetism values to calculate the dispersion when the sensor control microcomputer 12 obtains the geomagnetism values in each of the axes from the geomagnetism sensor 32. Further, when the sensor control microcomputer 12 obtains the geomagnetism values representing the composite value from the geomagnetism sensor 32, the sensor control microcomputer 12 obtains the geomagnetism values and calculates the dispersion using the composite value represented by the geomagnetism values.

In step S262, the sensor control microcomputer 12 compares the value of the dispersion thus calculated in step S260 with a threshold value determined in advance. When the sensor control microcomputer 12 determines that the dispersion is equal to or greater than the threshold value, the process proceeds to step S264. In step S264, the sensor control microcomputer 12 determines that the user who carries the electrical device 10 is in the moving state on the train. When the sensor control microcomputer 12 determines that the dispersion is smaller than the threshold value, the process proceeds to step S266. In step S266, the sensor control microcomputer 12 determines that the user is in the moving state in the automobile.

In general, when the user is moving on the train (especially, when the train is accelerating or decelerating), the geomagnetism value tends to be disturbed due to an electric motor, an electric cable, and the like. In the first embodiment, the sensor control microcomputer 12 is configured to determine whether the user is in the moving state in the automobile or on the train utilizing the disturbance of the geomagnetism value.

In the first embodiment, the dispersion of the geomagnetism value is calculated as a magnitude of the variance in the geomagnetism value, so that the determination is made according to the dispersion. It should be noted that the magnitude of the variance in the geomagnetism value is not limited to the dispersion of the geomagnetism value. For example, instead of the dispersion, the standard deviation may be used for the determination. When the standard deviation is used for the determination, a threshold value for the standard deviation may be stored in advance for the standard deviation. Accordingly, when the standard deviation is equal to or greater than the threshold value, it is possible to determine that the user is in the moving state on the train. Further, when the standard deviation is smaller than the threshold value, it is possible to determine that the user is in the moving state in the automobile.

Further, as the magnitude of the variance in the geomagnetism value, a difference between the maximum value and the minimum value of the geomagnetism values thus obtained may be used for the determination. Similarly, when the difference is used for the determination, a threshold value for the difference may be defined in advance for the difference. Accordingly, when the difference is equal to or greater than the threshold value, it is possible to determine that the user is in the moving state on the train. Further, when the difference is smaller than the threshold value, it is possible to determine that the user is in the moving state in the automobile.

Further, as the magnitude of the variance in the geomagnetism value, the maximum value or the minimum value of the geomagnetism values thus obtained may be used for the determination. More specifically, when the geomagnetism value is the maximum value (or the minimum value) not possible in a natural magnetic field, it is possible to determine that the user is in the moving state on the train. In particular, when the maximum value is used for the determination, a threshold value may be defined in advance for the maximum value. Accordingly, when the maximum value is equal to or greater than the threshold value, it is possible to determine that the user is in the moving state on the train. Further, when the maximum value is smaller than the threshold value, it is possible to determine that the user is in the moving state in the automobile. Alternatively, when the minimum value is used for the determination, a threshold value may be defined in advance for the minimum value. Accordingly, when the minimum value is equal to or smaller than the threshold value, it is possible to determine that the user is in the moving state on the train. Further, when the minimum value is greater than the threshold value, it is possible to determine that the user is in the moving state in the automobile.

In the first embodiment, it may be configured such that, when a difference between the maximum value of the geomagnetism values and an average value of the geomagnetism values is equal to or greater than a threshold value, it is possible to determine that the user is in the moving state on the train. Further, when the difference between the maximum value of the geomagnetism values and the average value of the geomagnetism values is smaller than a threshold value, it is possible to determine that the user is in the moving state in the automobile.

In the first embodiment, it may be configured such that, when the difference between the maximum value of the geomagnetism values and the average value of the geomagnetism values is equal to or greater than the threshold value, and a difference between the minimum value of the geomagnetism values and the average value of the geomagnetism values is equal to or greater than a threshold value, it is possible to determine that the user is in the moving state on the train. Further, when the difference between the maximum value of the geomagnetism values and the average value of the geomagnetism values is smaller than the threshold value, and the difference between the minimum value of the geomagnetism values and the average value of the geomagnetism values is smaller than the threshold value, it is possible to determine that the user is in the moving state in the automobile.

Further, in the first embodiment, similar to the determination whether the user in a tunnel, it may be configured such that a combination of a plurality of variables (the dispersion, the standard deviation, the difference between the maximum value and the minimum value, the maximum value, and the minimum value of the geomagnetism values) may be used for the determination.

In the moving state determining process, after the moving state of the electrical device 10 is determined in step S254, step S264, or step S266, the power source of the geomagnetic sensor 32 is turned off in step S268, thereby completing the process.

In the GPS control process, after the moving state of the electrical device 10 is determined in the moving state determining process in step S200 described above, the process proceeds to step S202 that corresponds to step S100 in the GPS control process in the first embodiment. In step S202, the sensor control microcomputer 12 obtains the atmospheric pressure value from the atmospheric pressure sensor 16.

In step S204 that corresponds to step S102 in the GPS control process in the first embodiment, the sensor control microcomputer 12 analyzes the wave shape of the atmospheric pressure from the atmospheric pressure values thus obtained.

In step S206, the sensor control microcomputer 12 obtains a threshold value according to the moving state of the electrical device 10 determined in the moving state determining process in step S200 described above. In this case, the variance (the change) in the atmospheric pressure in a tunnel may be varied depending on the moving state. For example, a moving speed could be different depending on the moving state. Accordingly, an average of the dispersion, the standard deviation, and the like may be varied depending on the moving state. To this end, in the second embodiment, the threshold value is determined in advance through an experiment and the like according to the moving state. Then, a correlation between the threshold value thus determined and the moving state is stored in the storage unit such as the ROM 22 of the sensor control microcomputer 12 and the like.

In the GPS control process, step S208, step S210, and step S212 correspond to step S104, step S106, and step S108 in the GPS control process in the first embodiment, respectively. More specifically, in step S208, the sensor control microcomputer 12 determines whether the current position of the electrical device 10 is in a tunnel according to the threshold value obtained in step S206. When the sensor control microcomputer 12 determines that the current position of the electrical device 10 is in the tunnel or enters the tunnel in step S208, the process proceeds to step S212. In step S212, the power source of the GPS 14 is turned off. Afterward, the process returns to step S202, so that the GPS control process is repeated. When the sensor control microcomputer 12 determines that the current position of the electrical device 10 is not in the tunnel or comes out from the tunnel in step S208, the process proceeds to step S210. In step S210, the power source of the GPS 14 is turned on. Afterward, the process returns to step S202, so that the GPS control process is repeated.

As described above, in the second embodiment, the sensor control microcomputer 12 determines the moving state of the electrical device 10. Further, the sensor control microcomputer 12 analyzes the wave shape of the atmospheric pressure values obtained with the atmospheric pressure sensor 16 for the specific period of time, so that the CPU 20 determines whether the electrical device 10 is in a tunnel according to the threshold value (the reference value) determined in advance according to the moving state. When the sensor control microcomputer 12 determines that the electrical device 10 is in the tunnel, the sensor control microcomputer 12 controls the power source of the GPS 14 to turn off. When the sensor control microcomputer 12 determines that the electrical device 10 comes out from the tunnel, the sensor control microcomputer 12 controls the power source of the GPS 14 to turn on.

Accordingly, in the second embodiment, the sensor control microcomputer 12 is capable of properly reducing the electric current consumption of the GPS 14 according to the moving state, thereby reducing the power consumption of the electrical device 10.

In the second embodiment, the sensor control microcomputer 12 is configured to obtain the threshold value according to the moving state, and to determine whether the current position of the electrical device 10 in the tunnel or not according to the threshold value. The present invention is not limited to the configuration. For example, the electrical device 10 passes through the tunnel for a different period of time depending on the moving state. Accordingly, in step S202, it may be configured to determine in advance a correlation between the moving state and the specific period of time during which the atmospheric pressure values are obtained.

Further, in the second embodiment, the acceleration sensor 30 and the geomagnetic sensor 32 are provided for determining the moving state of the electrical device 10. The present invention is not limited to the configuration. For example, the electrical device 10 may be provided with a sound collecting microphone, so that the sensor control microcomputer 12 analyzes sounds collected with the sound collecting microphone to determine the moving state.

Further, in the second embodiment, the sensor control microcomputer 12 determines one of the walking or running state, the moving state in the automobile, or the moving state in the train as the moving state of the electrical device 10. The present invention is not limited to the configuration. For example, the sensor control microcomputer 12 may be configured to determine an environmental state surrounding the electrical device 10 as the moving state of the electrical device 10. More specifically, the sensor control microcomputer 12 may be configured to use the sound collecting microphone to determine the environmental state that the electrical device 10 is surrounded by an environment where there are large sounds. In this case, it may be considered that the environmental state is the one where there are many moving objects such as vehicles. Accordingly, the sensor control microcomputer 12 obtains the atmospheric pressure values for the specific period of time, and determines whether the electrical device 10 is in the tunnel or not. On the other hand, when the sensor control microcomputer 12 determines the environmental state that the electrical device 10 is surrounded by an environment where there are little large sounds. In this case, it may be considered that the environmental state is the one where there are not many moving objects and the variance in the atmospheric pressure is small. Accordingly, the sensor control microcomputer 12 obtains the atmospheric pressure values for a period of time longer than the specific period of time.

Third Embodiment

A third embodiment of the present invention will be explained next. In the third embodiment, it is configured to specify a position of an exit of a tunnel. Accordingly, when the electrical device 10 comes out of the tunnel and the power source of the GPS 14 is turned on, it is possible for the GPS 14 to capture the GPS signal from the GPS satellite 1 more quickly using the position of the exit of the tunnel, thereby reducing more efficiently the electrical current consumption and the power consumption.

Figure 8:
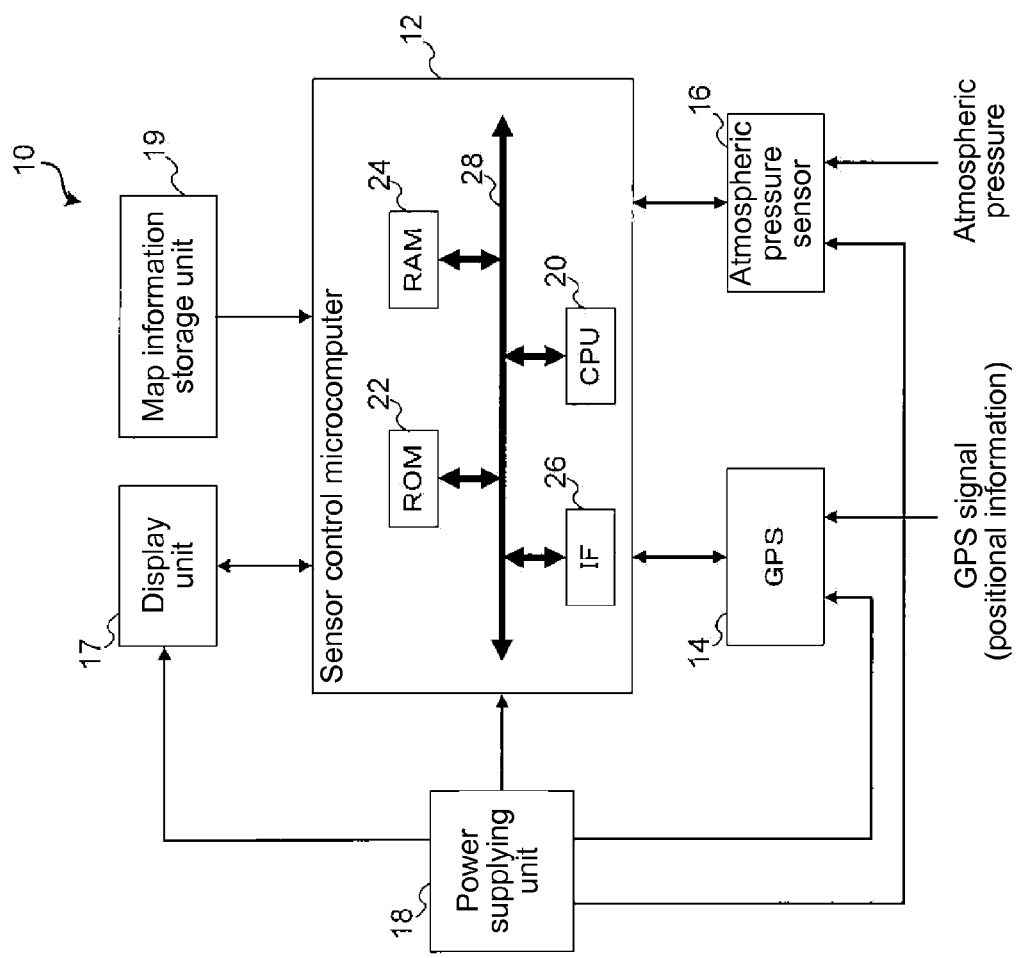
FIG. 8 is a block diagram showing a configuration of an electrical device according to a third embodiment of the present invention.

FIG. 8 is a block diagram showing a configuration of the electrical device 10 according to the third embodiment of the present invention. It should be noted that the electrical device 10 in the third embodiment includes components and performs an operation similar to those of the electrical device 10 in the first embodiment. Accordingly, the components in the third embodiment similar to those in the first embodiment are designated with the same reference numerals, and explanations thereof are omitted.

As shown in FIG. 8, the electrical device 10 includes the sensor control microcomputer 12; the GPS 14; the atmospheric pressure sensor 16; the display unit 17; the power supplying unit 18; and a map information storage unit 19. It should be noted that, different from the first embodiment, the electrical device 10 in the third embodiment includes the information storage unit 19.

In the third embodiment, the information storage unit 19 stores electric data of a map. More specifically, the information storage unit 19 is a storage unit such as a memory where the electric data of a map is stored. Alternatively, the information storage unit 19 may be configured to obtain a map according to the current position detected with the GPS 14 through a network (not shown) and the like, so that the information storage unit 19 stores the map. The configuration of the information storage unit 19 may be determined in advance in consideration of a storage capacity, the power consumption and the like thereof.

Figure 9:
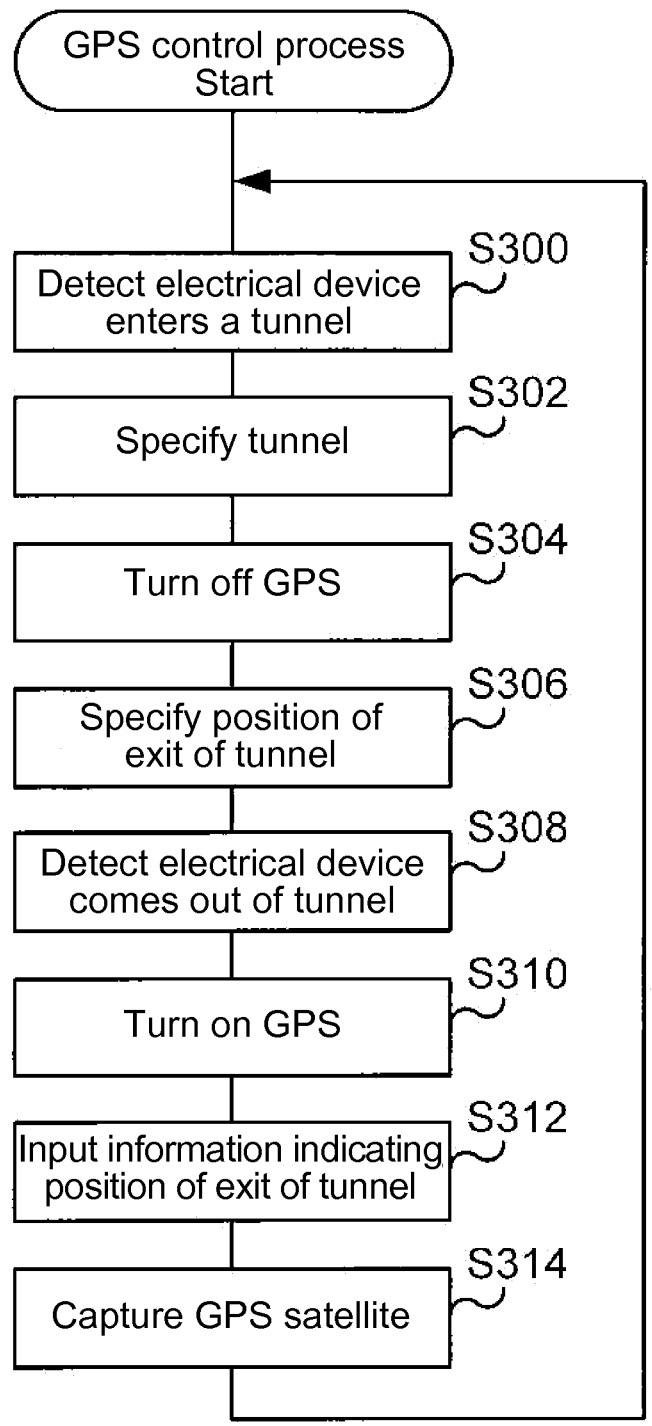
FIG. 9 is a flowchart showing an operation of a sensor control microcomputer of the electrical device in a GPS control process according to the third embodiment of the present invention.

An operation of the sensor control microcomputer 12 in the GPS control process will be explained next. FIG. 9 is a flowchart showing the operation of the sensor control microcomputer 12 of the electrical device 10 in the GPS (Global Positioning System) control process according to the third embodiment of the present invention. It should be noted that, the GPS control process shown in FIG. 9 includes steps similar to those in the GPS control process in the first embodiment (refer to FIG. 3). Accordingly, the steps in the third embodiment similar to those in the first embodiment are noted as such, and explanations thereof are omitted.

Figure 10:
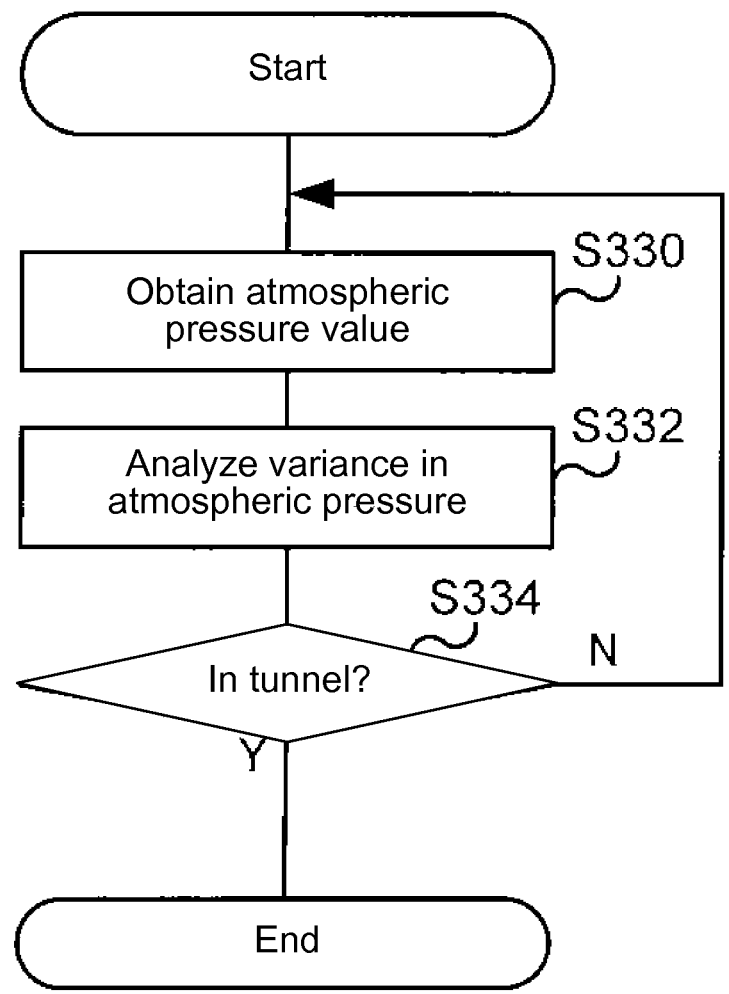
FIG. 10 is a flowchart showing an example of the operation of the sensor control microcomputer of the electrical device in the GPS control process for detecting that the electrical device enters a tunnel according to an atmospheric pressure value according to the third embodiment of the present invention.

In step S300, the sensor control microcomputer 12 detects that the electrical device 10 enters a tunnel. FIG. 10 is a flowchart showing an example of the operation of the sensor control microcomputer 12 of the electrical device 10 in the GPS control process for detecting that the electrical device 10 enters the tunnel according to the atmospheric pressure value according to the third embodiment of the present invention. It should be noted that step S330, step S332, and step S334 shown in FIG. 10 correspond to step S100, step S102, and step S104 in the GPS control process in the first embodiment.

In step S330, the sensor control microcomputer 12 obtains the atmospheric pressure value from the atmospheric pressure sensor 16. In step S332, the sensor control microcomputer 12 analyzes the wave shape of the atmospheric pressure values thus obtained. In step S334, the sensor control microcomputer 12 determines whether the current position of the electrical device 10 is in the tunnel according to the analysis result in step S332.

In the GPS control process, when the sensor control microcomputer 12 determines that the current position of the electrical device 10 is not in the tunnel in step S334, the process returns to step S330, so that the GPS control process is repeated. On the other hand, when the sensor control microcomputer 12 determines that the current position of the electrical device 10 is in the tunnel in step S334, the sensor control microcomputer 12 detects that the electrical device 10 enters the tunnel, so that the process is completed.

In the third embodiment, the sensor control microcomputer 12 detects whether the electrical device 10 enters the tunnel through the process shown in FIG. 10, and the present invention is not limited to the process. For example, the sensor control microcomputer 12 may be configured to detect whether the electrical device 10 enters the tunnel using the map information stored in the electrical device 10.

Figure 11:
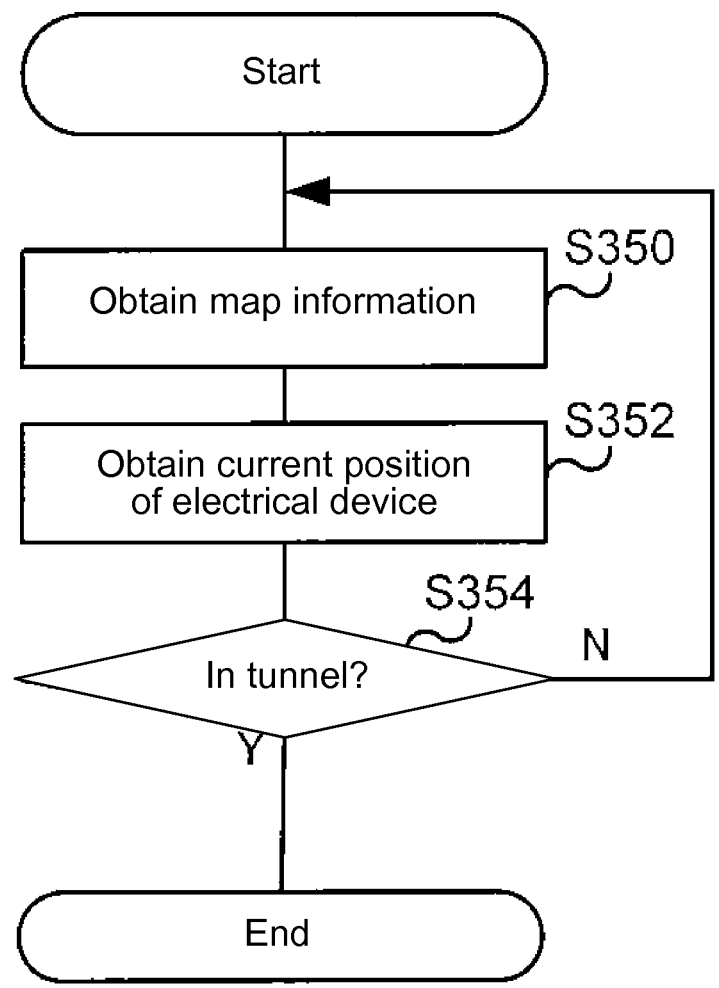
FIG. 11 is a flowchart showing an example of the operation of the sensor control microcomputer of the electrical device in the GPS control process for detecting that the electrical device enters a tunnel according to map information according to the third embodiment of the present invention.

FIG. 11 is a flowchart showing an example of the operation of the sensor control microcomputer 12 of the electrical device 10 in the GPS control process for detecting that the electrical device 10 enters the tunnel according to the map information stored in the electrical device 10 according to the third embodiment of the present invention.

In step S350, the sensor control microcomputer 12 obtains the map information from the information storage unit 19. In step S352, the sensor control microcomputer 12 obtains the current position of the electrical device 10 detected with the GPS 14. In step S354, the sensor control microcomputer 12 determines whether the current position of the electrical device 10 is in the tunnel according to the map information and the current position of the electrical device 10 thus obtained.

In the GPS control process, when the sensor control microcomputer 12 determines that the current position of the electrical device 10 is not in the tunnel in step S354, the process returns to step S350, so that the GPS control process is repeated. On the other hand, when the sensor control microcomputer 12 determines that the current position of the electrical device 10 is in the tunnel in step S354, the sensor control microcomputer 12 detects that the electrical device 10 enters the tunnel, so that the process is completed.

It should be noted that, when the sensor control microcomputer 12 determines whether the current position of the electrical device 10 is in the tunnel according to the atmospheric pressure values obtained from the atmospheric pressure sensor 16, it is possible to reduce the calculation load of the sensor control microcomputer 12 as opposed to when the sensor control microcomputer 12 determines whether the current position of the electrical device 10 is in the tunnel according to the map information stored in the information storage unit 19. Accordingly, when the sensor control microcomputer 12 determines the current position of the electrical device 10 according to the atmospheric pressure values, it is possible to detect the current position more accurately with less electrical current consumption, thereby reducing the power consumption of the electrical device 10.

In the GPS control process, after the sensor control microcomputer 12 determines that the current position of the electrical device 10 is in the tunnel, the sensor control microcomputer 12 specifies the tunnel at the current position in step S302. More specifically, the sensor control microcomputer 12 is configured to specify the tunnel at the current position according to the map information obtained from the information storage unit 19 and the current position of the electrical device 10 obtained from the GPS 14.

It should be noted that at this moment, the electrical device 10 is in the tunnel, so that the GPS 14 is not capable of receiving the GPS signal from the GPS satellite 1. Accordingly, it is configured such that the current position of the electrical device 10 obtained from the GPS 14 according to the GPS signal thus received is stored in the storage unit such as the ROM 22 and the like just before (immediately before) the electrical device 10 enters the tunnel. Accordingly, the sensor control microcomputer 12 specifies the tunnel at the current position according to the current position of the electrical device 10 stored in the storage unit. It should be noted that it is not necessary to specify the tunnel at the current position at a speed not as high as that in determining whether the electrical device 10 enters the tunnel in step S300. Further, it is possible to specify the tunnel at the current position with accuracy lower than that in the process shown in FIG. 11.

In step S304, the sensor control microcomputer 12 controls the power source of the GPS 14 to turn off. It should be noted that step S302 and step S304 may be performed in a reversed order.

In step S306, the sensor control microcomputer 12 specifies the position of the exit of the tunnel. As described above, the sensor control microcomputer 12 specifies the tunnel in step S302. Accordingly, the sensor control microcomputer 12 similarly specifies the position of the exit of the tunnel using the map information stored in the information storage unit 19. Accordingly, in the third embodiment, while the current position of the electrical device 10 is in the tunnel, the position of the exit of the tunnel is specified.

Figure 12:
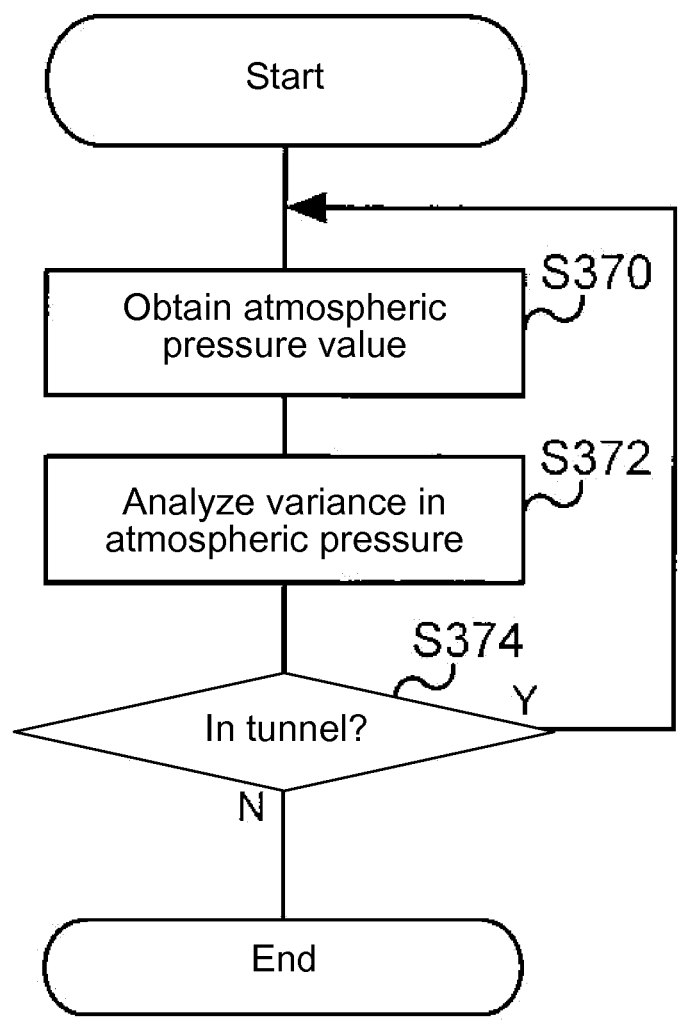
FIG. 12 is a flowchart showing an example of the operation of the sensor control microcomputer of the electrical device in the GPS control process for detecting that the electrical device moves out from a tunnel according to the third embodiment of the present invention.

In step S308, the sensor control microcomputer 12 detects that the electrical device 10 comes out from the tunnel. FIG. 12 is a flowchart showing an example of the operation of the sensor control microcomputer 12 of the electrical device 10 in the GPS control process for detecting that the electrical device 10 moves out from the tunnel according to the third embodiment of the present invention. It should be noted that step S370, step S372, and step S374 shown in FIG. 12 correspond to step S100, step S102, and step S104 in the GPS control process in the first embodiment.

In step S370, the sensor control microcomputer 12 obtains the atmospheric pressure value from the atmospheric pressure sensor 16. In step S372, the sensor control microcomputer 12 analyzes the wave shape of the atmospheric pressure values thus obtained. In step S374, the sensor control microcomputer 12 determines whether the current position of the electrical device 10 is in the tunnel according to the analysis result in step S372.

In the GPS control process, when the sensor control microcomputer 12 determines that the current position of the electrical device 10 is in the tunnel in step S374, the process returns to step S370, so that the GPS control process is repeated. On the other hand, when the sensor control microcomputer 12 determines that the current position of the electrical device 10 is not in the tunnel in step S374, the sensor control microcomputer 12 detects that the electrical device 10 moves out from the tunnel, so that the process is completed.

After the sensor control microcomputer 12 determines that the electrical device 10 moves out from the tunnel, the sensor control microcomputer 12 controls the power source of the GPS 14 to turn on in step S310. In step S312, the sensor control microcomputer 12 inputs information indicating the position of the exit of the tunnel identified in step S306 into the GPS 14. In step S314, the GPS satellite 1 is captured, and the process returns to step S300, so that the GPS control process is repeated.

As described above, in the third embodiment, when the sensor control microcomputer 12 detects that the electrical device 10 enters the tunnel, the sensor control microcomputer 12 controls the power source of the GPS 14 to turn off. Further, the sensor control microcomputer 12 specifies the position of the exit of the tunnel at the current position according to the map information obtained from the information storage unit 19 and the current position of the electrical device 10 obtained from the GPS 14. Then, when the sensor control microcomputer 12 detects that the electrical device 10 moves out from the tunnel, the sensor control microcomputer 12 controls the power source of the GPS 14 to turn on. Further, the sensor control microcomputer 12 inputs the position of the exit of the tunnel thus specified into the GPS 14.

Once the power source of the GPS 14 is turned off, when the power source of the GPS 14 is turned on again, it may take a certain period of time for the GPS 14 to capture the GPS signal transmitted from the GPS satellite 1. Further, when the GPS 14 tries to capture the GPS signal transmitted from the GPS satellite 1, the GPS 14 tends to consume a relatively large amount of the electrical current. However, when the positional information of the current position of the electrical device 10 is identified, it is relatively easy for the GPS 14 to capture the GPS signal transmitted from the GPS satellite 1, thereby preserving the electrical current consumption.

In the third embodiment, the sensor control microcomputer 12 specifies the position of the exit of the tunnel at the current position while the power source of the GPS 14 is turned off. Then, when the power source of the GPS 14 is turned on, the sensor control microcomputer 12 inputs the position of the exit of the tunnel thus specified into the GPS 14. Accordingly, it is relatively easy for the GPS 14 to capture the GPS signal transmitted from the GPS satellite 1, and it is possible to reduce the period of time for the GPS 14 to capture the GPS signal transmitted from the GPS satellite 1, thereby preserving the electrical current consumption and reducing the power consumption of the electrical device 10.

In the third embodiment, the sensor control microcomputer 12 specifies the position of the exit of the tunnel at the current position. When a tunnel has a branched route and a plurality of exits, it may be configured such that an atmospheric pressure gradient or an atmospheric pressure variance pattern in each of paths before and after the branched route is stored in advance per tunnel in the storage unit such as the ROM 22 and the like. In this case, the sensor control microcomputer 12 compares the atmospheric pressure gradient or the atmospheric pressure variance pattern thus stored with the analytical result of the wave shape of the atmospheric pressure values obtained from the atmospheric pressure sensor 16, so that the sensor control microcomputer 12 is capable of determining which path the electrical device 10 is moving and specifying the position of the exit of the tunnel at the current position.

Fourth Embodiment

A fourth embodiment of the present invention will be explained next. In the fourth embodiment, in addition to the sensor control microcomputer 12, the electrical device 10 includes a main CPU (Central Processing Unit) 40 for controlling an entire operation of the electrical device 10.

Figure 13:
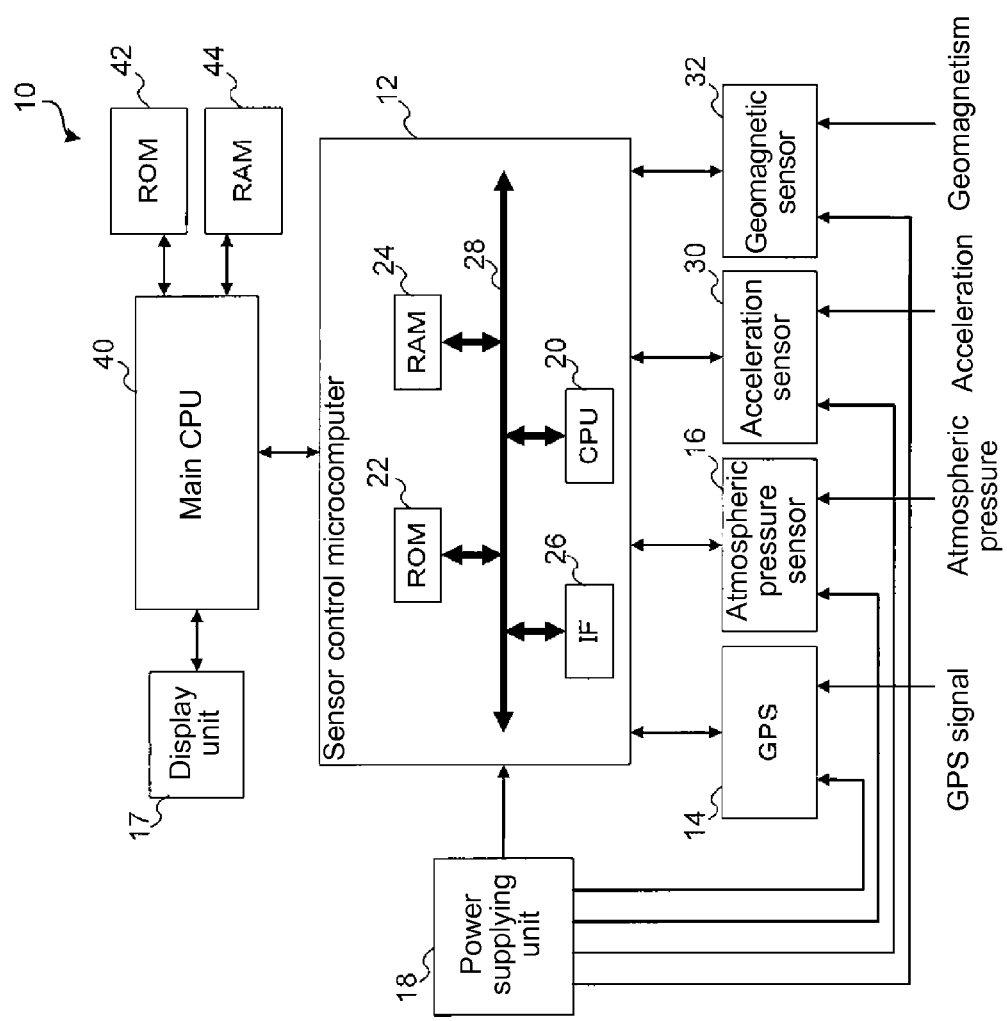
FIG. 13 is a block diagram showing a configuration of an electrical device having a main CPU (Central Processing Unit) according to a fourth embodiment of the present invention.

FIG. 13 is a block diagram showing a configuration of the electrical device 10 having the main CPU (Central Processing Unit) 40 according to the fourth embodiment of the present invention. As shown in FIG. 13, the electrical device 10 includes the main CPU 40; an ROM 42; and an RAM 44.

In the fourth embodiment, the main CPU 40 has higher performance and larger electrical current consumption (larger power consumption) relative to the CPU 20 of the sensor control microcomputer 12. The main CPU 40 is connected to the sensor control microcomputer 12, the ROM 42, and the RAM 44. Further, the main CPU 40 is connected to the display unit 17, so that the main CPU 40 controls the display unit 17. The main CPU 40 is connected to the sensor control microcomputer 12 through the IF 26. Further, the power supplying unit 18 is configured to supply power to the main CPU 40 and the display unit 17, and another power supplying unit may be provided for supplying power to the main CPU 40 and the display unit 17.

In the fourth embodiment, when the main CPU 40 executes a program stored in the ROM 42, various functions of the program are realized. Further, when the main CPU 40 executes the program, the RAM 44 functions as a work memory and the like.

It should be noted that, in the fourth embodiment, the sensor control microcomputer 12 is configured to perform the GPS control process of the GPS 14, not the main CPU 40.

Accordingly, in the electrical device 10, it is possible to perform the GPS control process in a state that the electrical current consumption is reduced and the power consumption is restricted when the main CPU 40 is transited to a sleep state and the like in which the power consumption of the main CPU 40 can be reduced. It should be noted that the GPS control process performed with the sensor control microcomputer 12 in the fourth embodiment is similar to the GPS control process in the second embodiment (refer to FIGS. 6 and 7).

Further, in the electrical device 10 in the fourth embodiment, when the determination result determined with the sensor control microcomputer 12 in the GPS control process is displayed on the display unit 17, the main CPU 40 obtains the determination result from the sensor control microcomputer 12 and displays the determination result thus obtained on the display unit 17. Accordingly, it is necessary to turn on the main CPU 40 only when the main CPU 40 obtains the determination result from the sensor control microcomputer 12 and displays the determination result thus obtained on the display unit 17, thereby reducing the electrical current consumption and restricting the power consumption of the electrical device 10.

Fifth Embodiment

Figure 14:
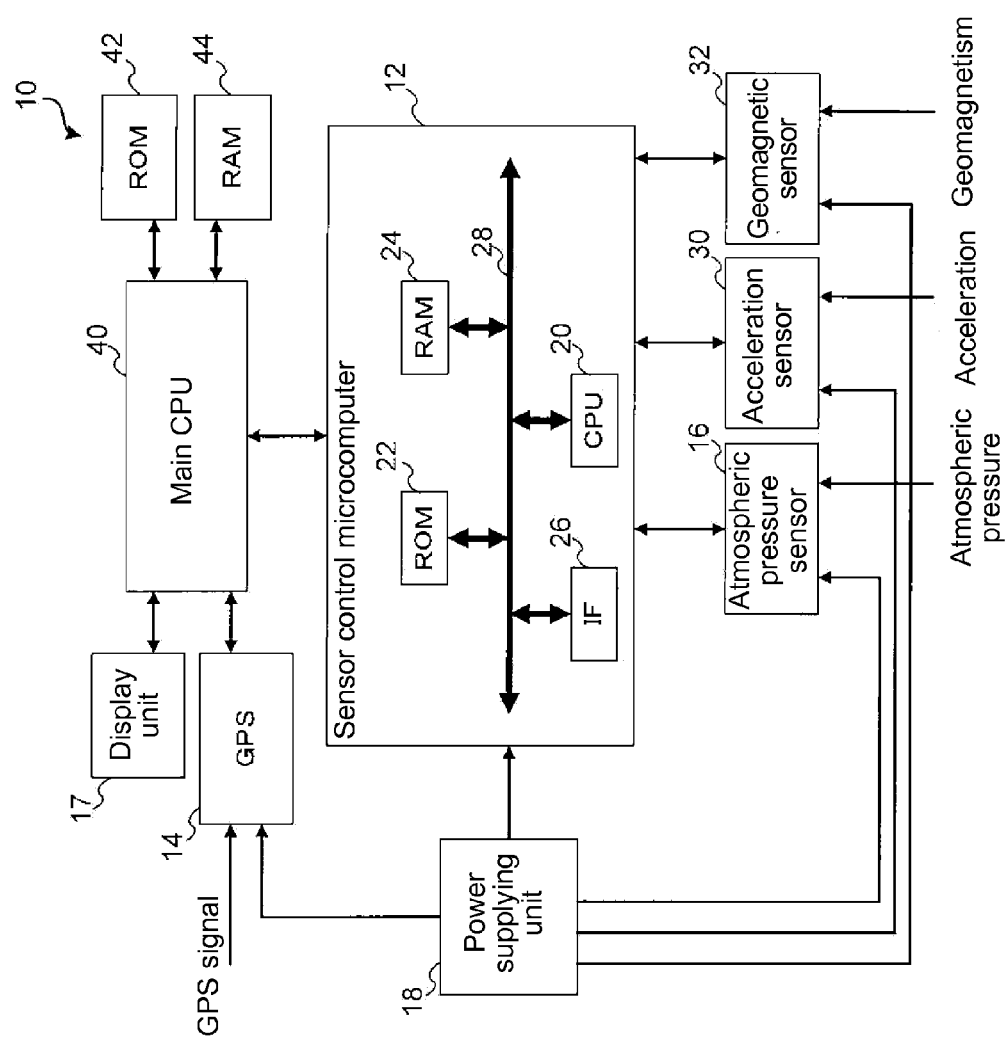
FIG. 14 is a block diagram showing a configuration of an electrical device having a main CPU according to a fifth embodiment of the present invention.

A fifth embodiment of the present invention will be explained next. FIG. 14 is a block diagram showing a configuration of the electrical device 10 having the main CPU 40 according to the fifth embodiment of the present invention. It should be noted that the electrical device 10 in the fifth embodiment includes components and performs an operation similar to those of the electrical device 10 in the fourth embodiment shown in FIG. 13. Accordingly, the components in the fifth embodiment similar to those in the fourth embodiment are designated with the same reference numerals, and explanations thereof are omitted.

As shown in FIG. 14, in the electrical device 10, different from the electrical device 10 in the fourth embodiment shown in FIG. 13, the GPS 14 is connected to the main CPU 40, not the sensor control microcomputer 12. It should be noted that in the electrical device 10 shown in FIG. 14, the sensor control microcomputer 12 is still configured to perform the GPS control process. In this case, the main CPU 40 controls the GPS 14. Accordingly, when the sensor control microcomputer 12 performs the GPS control process, the sensor control microcomputer 12 controls the power source of the GPS 14 to turn on or turn off through the main CPU 40.

Sixth Embodiment

Figure 15:
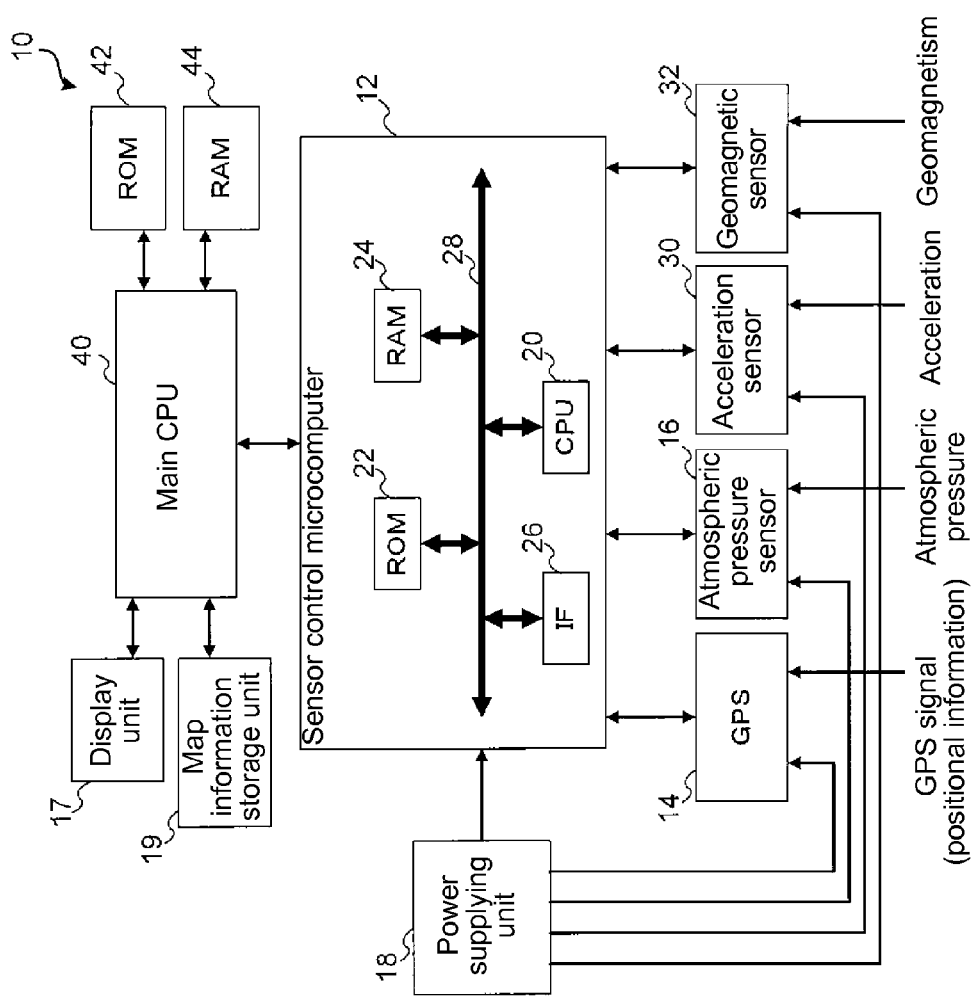
FIG. 15 is a block diagram showing a configuration of an electrical device having a main CPU according to a sixth embodiment of the present invention.

A sixth embodiment of the present invention will be explained next. FIG. 15 is a block diagram showing a configuration of the electrical device 10 having the main CPU 40 according to the sixth embodiment of the present invention. It should be noted that the electrical device 10 in the sixth embodiment includes components and performs an operation similar to those of the electrical device 10 in the fourth embodiment shown in FIG. 13. Accordingly, the components in the sixth embodiment similar to those in the fourth embodiment are designated with the same reference numerals, and explanations thereof are omitted.

As shown in FIG. 15, in the electrical device 10, different from the electrical device 10 in the fourth embodiment shown in FIG. 13, the information storage unit 19 is connected to the main CPU 40, not the sensor control microcomputer 12. It should be noted that in the electrical device 10 shown in FIG. 15, the sensor control microcomputer 12 is still configured to perform the GPS control process. In this case, the main CPU 40 controls the GPS 14. Accordingly, when the sensor control microcomputer 12 performs the GPS control process, the sensor control microcomputer 12 obtains the map information from the information storage unit 19 through the main CPU 40.

In this case, it is preferably configured such that the sensor control microcomputer 12 obtains the map information within a specific range from the information storage unit 19 before the main CPU 40 is transited to the sleep state and the like in which the power consumption of the main CPU 40 can be reduced. Further, it is preferably configured such that the map information within the specific range is stored in the storage unit such as the ROM 22 in the sensor control microcomputer 12 or a storage unit (not shown) that the sensor control microcomputer 12 directly controls. Accordingly, even when the main CPU 40 is in the sleep state, it is possible to perform the GPS control process with the sensor control microcomputer 12 without starting up the main CPU 40.

Further, in the sixth embodiment, it is preferably configured such that the map information within the specific range is stored according to the moving state of the electrical device 10. Accordingly, it is possible to shorten a period of time necessary for storing the map information. As a result, it is possible to maintain the main CPU 40 in the sleep state for an extended period of time, and to reduce the storage capacity necessary for storing the map information, thereby reducing the electrical current consumption and restricting the power consumption of the electrical device 10.

In the first to sixth embodiments described above, the sensor control microcomputer 12 is configured to control the power source of the GPS 14 to turn on or turn off. The present invention is not limited to the configuration. When the GPS 14 is provided with a power source unit, the sensor control microcomputer 12 may be configured to control the power source unit of the GPS 14 to turn on or turn off. Alternatively, the sensor control microcomputer 12 may be configured to control the power supplying unit 18 to supply the power to the GPS 14, so that the power source of the GPS 14 is controlled to turn on or turn off.

In the first to sixth embodiments described above, the sensor control microcomputer 12 determines whether the electrical device 10 is in the tunnel as the place where the GPS signal transmitted from the GPS satellite 1 does not reach. The place may be another place other than the tunnel. For example, the place where the GPS signal transmitted from the GPS satellite 1 does not reach may include underground or inside a specific building. In this case, the variance in the atmospheric pressure value at the place is determined in advance through an experiment and the like. Accordingly, the current position of the electrical device 10 is determined using the threshold value determined according to the variance in the atmospheric pressure value, thereby making it possible for the sensor control microcomputer 12 to control the power source of the GPS 14.

In the first to sixth embodiments described above, the configurations, the operations, and the processes of the electrical device 10 and the sensor control microcomputer 12 are just examples, and the present invention may be modified within the scope thereof.

The disclosure of Japanese Patent Application No. 2012-287945, filed on Dec. 28, 2012, is incorporated in the application by reference.

While the invention has been explained with reference to the specific embodiments of the invention, the explanation is illustrative and the invention is limited only by the appended claims.

What is claimed is:

1. A semiconductor device, comprising: an atmospheric pressure value obtaining unit configured to obtain an atmospheric pressure value from an atmospheric pressure sensor;
   a moving state determining unit configured to determine a moving state of the semiconductor device as one of a moving state in an automobile, a moving state on a train, a walking state, and a running state; and
   a control unit configured to detect a variance state of the atmospheric pressure value obtained with the atmospheric pressure value obtaining unit,
   wherein said control unit is configured to control an on state and an off state of a power source of a GPS (Global Positioning System) device according to a determination whether the variance state satisfies a specific condition,
   said control unit is configured to control the on state and the off state of the power source of the GPS according to the specific condition corresponding to the moving state determined with the moving state determining unit,
   said moving state determining unit includes a geomagnetic sensor configured to determine the moving state of the semiconductor device as the moving state in the automobile or the moving state on the train, and
   wherein said control unit is configured to determine whether the semiconductor device is located in a tunnel according to the variance state and the specific condition, and
   said control unit is configured to control the power source of the GPS to turn off when the control unit determines that the semiconductor device is located in the tunnel,
   wherein said control unit is configured to control the power source of the GPS to turn on when the control unit determines that the semiconductor device is not located in the tunnel,
   said GPS device is configured to detect a position thereof based on a GPS signal received therewith and output positional information.

2. The semiconductor device according to claim 1, further comprising a map information obtaining unit configured to obtain map information,
   wherein said control unit is configured to specify the tunnel according to the map information obtained with the map information obtaining unit and the positional information output from the GPS device just before, the power source of the GPS is turned off when the control unit determines that the semiconductor device is located in the tunnel.

3. The semiconductor device according to claim 2, wherein said control unit is configured to detect an exit of the tunnel according to the map information, and
   said control unit is configured to control the power source of the GPS to turn on and input a position of the exit into the GPS device when the control unit determines that the semiconductor device comes out from the exit and is not located in the tunnel.

4. The semiconductor device according to claim 1, wherein said control unit is configured to determine the specific condition according to a correlation between the moving state and the specific condition, said correlation being determined in advance.

5. The semiconductor device according to claim 1, wherein said atmospheric pressure value obtaining unit is configured to determine an obtaining period of time during which the atmospheric pressure value obtaining unit obtains the atmospheric pressure value according to a. correlation between the moving state and the obtaining period of time, said correlation being determined in advance.

6. An electrical device comprising:
   said semiconductor device according to claim 1:
   said GPS device configured to detect the position thereof based on the GPS signal received therewith;
   a power supplying unit configured. to supply power to the GPS device; and
   a display unit configured to display a position detection result of the GPS device.

7. A method of controlling a power source of an electrical device having a GPS (Global Positioning system), comprising:
   an atmospheric pressure value obtaining step of obtaining an atmospheric pressure value from an atmospheric pressure sensor;
   a detection step of detecting a variance state of the atmospheric pressure value obtained in the atmospheric pressure value obtaining step;
   a moving state determining step of determining a moving state of the electrical device as one of a moving state in an automobile, a moving state on a train, a walking state, and a running state with a moving state determining unit including a geomagnetic sensor; and
   a power source controlling step of controlling an on state and an off state of a power source of the GPS device according to a determination whether the variance state and/or the moving state satisfies a specific condition,
   wherein said control unit is configured to determine whether the semiconductor device is located in a tunnel according to the variance state and the specific condition, and
   said control unit is configured to control the power source of the GPS to turn off when the control unit determines that the semiconductor device is located in the tunnel,
   wherein said control unit is configured to control the power source of the GPS to turn on when the control unit determines that the semiconductor device is not located in the tunnel,
   wherein said GPS device is configured to detect a position thereof based on a GPS signal received therewith.

* * * * *